US00RE44252E

(19) United States
(12) Reissued Patent
Jones et al.

(10) Patent Number: US RE44,252 E
(45) Date of Reissued Patent: Jun. 4, 2013

(54) COIN REDEMPTION SYSTEM

(75) Inventors: William J. Jones, Barrington, IL (US); Douglas U. Mennie, Barrington, IL (US); Jeffrey G. Knoll, Carol Stream, IL (US)

(73) Assignee: Cummins-Allison Corp., Mt. Prospect, IL (US)

(21) Appl. No.: 11/805,863

(22) Filed: May 23, 2007

Related U.S. Patent Documents

Reissue of:
(64) Patent No.: 6,896,118
Issued: May 24, 2005
Appl. No.: 10/339,149
Filed: Jan. 9, 2003

U.S. Applications:
(60) Provisional application No. 60/364,628, filed on Mar. 15, 2002, provisional application No. 60/347,476, filed on Jan. 10, 2002.

(51) Int. Cl.
*G07F 7/00* (2006.01)

(52) U.S. Cl.
USPC ..... 194/217

(58) Field of Classification Search
USPC ..... 194/217, 215, 216; 209/534; 235/378, 235/379, 380; 186/35, 37; 705/64, 72, 77, 705/79; 902/1, 4, 5, 22, 23, 25
See application file for complete search history.

(56) References Cited

U.S. PATENT DOCUMENTS

| | | | | |
|---|---|---|---|---|
| 446,303 | A | 2/1891 | Thompson | |
| 2,570,920 | A | 10/1951 | Clough et al. | 232/16 |
| 2,669,998 | A | 2/1954 | Buchholz | 133/8 |
| 2,750,949 | A | 6/1956 | Kulo et al. | 133/8 |
| 2,835,260 | A | 5/1958 | Buchholz | 133/8 |
| 2,865,561 | A | 12/1958 | Rosapepe | 232/7 |
| 2,936,684 | A | 5/1960 | Simjian | 95/11 |
| 3,104,314 | A | 9/1963 | Simjian | 235/619 |

(Continued)

FOREIGN PATENT DOCUMENTS

| | | | |
|---|---|---|---|
| CA | 2235925 | C | 11/1995 |
| CA | 2189330 | C | 12/2000 |

(Continued)

OTHER PUBLICATIONS

Interview Summary (From prosecution history of U.S. Appl. No. 10/198,872).

(Continued)

*Primary Examiner* — Mark Beauchaine
(74) *Attorney, Agent, or Firm* — Nixon Peabody LLP

(57) ABSTRACT

According to one embodiment of the present invention, a coin redemption system, in which a user deposits a batch of mixed coins of a plurality of denominations, comprises a coin input area for receiving a batch of mixed coins from a user of the coin redemption system, a coin processing unit coupled to the coin input area for determining the aggregate value of the coins received from the user, a controller for assigning a transaction number corresponding to the batch of received coins, a first printer for printing a receipt indicative of the determined value and the assigned transaction number, an output device disposed in a redemption area for displaying the assigned transaction number and the determined value.

14 Claims, 5 Drawing Sheets

U.S. PATENT DOCUMENTS

| | | | | |
|---|---|---|---|---|
| 3,132,654 | A | 5/1964 | Adams | 133/1 |
| 3,148,932 | A | 9/1964 | Simjian | 346/22 |
| 3,150,912 | A | 9/1964 | Simjian | 346/22 |
| 3,173,742 | A | 3/1965 | Simjian | 346/22 |
| 3,246,295 | A | 4/1966 | DeClaris et al. | 382/56 |
| 3,280,974 | A | 10/1966 | Riddle et al. | |
| 3,376,970 | A | 4/1968 | Roseberg | 198/40 |
| 3,443,107 | A | 5/1969 | Modglin | 250/219 |
| 3,480,785 | A | 11/1969 | Aufderheide | 250/219 |
| 3,496,370 | A | 2/1970 | Haville et al. | 250/219 |
| 3,509,535 | A | 4/1970 | Berube | 340/149 |
| 3,612,835 | A | 10/1971 | Andrews et al. | |
| 3,618,765 | A | 11/1971 | Syoasel et al. | 209/122 |
| 3,656,615 | A | 4/1972 | Ptacek | 209/73 |
| 3,679,314 | A | 7/1972 | Mustert | 356/71 |
| 3,705,384 | A | 12/1972 | Wahlberg | 705/5 |
| 3,715,031 | A | 2/1973 | Okkonen | 209/75 |
| 3,725,667 | A | 4/1973 | Schwartz | 250/219 DQ |
| 3,764,899 | A | 10/1973 | Peterson | 324/61 R |
| 3,771,583 | A | 11/1973 | Bottemiller | 160/327 |
| 3,778,595 | A | 12/1973 | Hatanaka et al. | 235/61.7 B |
| 3,778,628 | A | 12/1973 | Novak et al. | 250/556 |
| 3,782,543 | A | 1/1974 | Martelli et al. | 209/75 |
| 3,798,603 | A | 3/1974 | Wahlberg | 340/149 |
| 3,800,078 | A | 3/1974 | Cochran et al. | 178/71 |
| 3,806,710 | A | 4/1974 | Shigemori et al. | 235/92 |
| 3,815,021 | A | 6/1974 | Kerr | 324/61 R |
| 3,842,281 | A | 10/1974 | Goodrich | 250/461 |
| 3,870,629 | A | 3/1975 | Carter et al. | |
| 3,906,449 | A | 9/1975 | Marchak | 340/149 R |
| 3,916,922 | A | 11/1975 | Prumm | 133/3 R |
| 3,930,582 | A | 1/1976 | Gartner et al. | 209/88 |
| 3,966,047 | A | 6/1976 | Steiner | 209/75 |
| 3,976,198 | A | 8/1976 | Carnes, Jr. et al. | |
| 3,998,237 | A | 12/1976 | Kressin | 133/3 A |
| 3,998,379 | A | 12/1976 | Myers et al. | 229/33 |
| 4,023,011 | A | 5/1977 | Nakajima et al. | |
| 4,041,456 | A | 8/1977 | Ott et al. | 382/135 |
| 4,050,218 | A | 9/1977 | Call | 53/167 |
| 4,059,122 | A | 11/1977 | Kinoshita | 133/3 D |
| 4,075,460 | A | 2/1978 | Gorgens | 235/420 |
| 4,096,991 | A | 6/1978 | Iguchi | 235/419 |
| 4,109,238 | A | 8/1978 | Creekmore | 340/149 |
| 4,114,804 | A | 9/1978 | Jones et al. | 235/476 |
| 4,124,111 | A | 11/1978 | Hayashi | 194/102 |
| 4,147,430 | A | 4/1979 | Gorgone et al. | 356/51 |
| 4,150,740 | A | 4/1979 | Douno | 194/4 C |
| 4,166,945 | A | 9/1979 | Inoyama et al. | 235/379 |
| 4,172,462 | A | 10/1979 | Uchida et al. | 133/3 A |
| 4,179,685 | A | 12/1979 | O'Maley | 340/146.3 H |
| 4,179,723 | A | 12/1979 | Spencer | 361/384 |
| 4,184,366 | A | 1/1980 | Butler | 73/163 |
| 4,187,463 | A | 2/1980 | Kivenson | 324/228 |
| 4,197,986 | A | 4/1980 | Nagata | 235/379 |
| 4,205,780 | A | 6/1980 | Burns et al. | 235/454 |
| 4,208,549 | A | 6/1980 | Polillo et al. | 179/6.3 R |
| 4,228,812 | A | 10/1980 | Marti | 133/3 F |
| 4,231,014 | A | 10/1980 | Ponzio | |
| 4,232,295 | A | 11/1980 | McConnell | 340/152 R |
| 4,234,003 | A | 11/1980 | Ristvedt et al. | 133/3 |
| 4,237,378 | A | 12/1980 | Jones | 250/223 R |
| 4,249,552 | A | 2/1981 | Margolin et al. | 133/1 R |
| 4,250,806 | A | 2/1981 | Boyson et al. | 101/2 |
| 4,251,867 | A | 2/1981 | Uchida et al. | 364/408 |
| 4,255,651 | A | 3/1981 | Phillips | 235/92 |
| 4,264,808 | A | 4/1981 | Owens et al. | 235/379 |
| 4,266,121 | A | 5/1981 | Hirose | 235/381 |
| 4,275,874 | A | 6/1981 | DiBlasio | 271/4 |
| 4,277,774 | A | 7/1981 | Fujii et al. | |
| 4,283,708 | A | 8/1981 | Lee | |
| 4,286,703 | A | 9/1981 | Schuller et al. | 194/100 A |
| 4,288,781 | A | 9/1981 | Sellner et al. | |
| RE30,773 | E | 10/1981 | Glaser et al. | 235/379 |
| 4,302,781 | A | 11/1981 | Ikeda et al. | 358/486 |
| 4,310,885 | A | 1/1982 | Azcua et al. | 364/405 |
| 4,311,914 | A | 1/1982 | Huber | 250/556 |
| 4,313,598 | A | 2/1982 | DiBlasio | 271/124 |
| 4,317,957 | A | 3/1982 | Sendrow | 178/22.08 |
| 4,321,672 | A | 3/1982 | Braun et al. | 364/408 |
| 4,334,619 | A | 6/1982 | Horino et al. | 209/551 |
| 4,337,864 | A | 7/1982 | McLean | 209/534 |
| 4,341,951 | A | 7/1982 | Benton | 235/379 |
| 4,348,656 | A | 9/1982 | Gorgone et al. | |
| 4,349,111 | A | 9/1982 | Shah et al. | 209/534 |
| 4,352,988 | A | 10/1982 | Ishida | 250/559 |
| 4,355,300 | A | 10/1982 | Weber | |
| 4,355,369 | A | 10/1982 | Garvin | 364/900 |
| 4,356,473 | A | 10/1982 | Freudenthal | |
| 4,360,034 | A | 11/1982 | Davila et al. | 133/3 D |
| 4,369,442 | A | 1/1983 | Werth et al. | 340/825.35 |
| 4,380,316 | A | 4/1983 | Glinka et al. | 232/16 |
| 4,381,447 | A | 4/1983 | Horvath et al. | 250/223 |
| 4,383,540 | A | 5/1983 | DeMeyer et al. | 133/3 H |
| 4,385,285 | A | 5/1983 | Horst et al. | 382/3 |
| 4,386,432 | A | 5/1983 | Nakamura et al. | 382/7 |
| 4,396,902 | A | 8/1983 | Warthan et al. | 382/64 |
| 4,412,292 | A | 10/1983 | Sedam et al. | 364/479 |
| 4,416,299 | A | 11/1983 | Bergman | 133/1 R |
| 4,417,136 | A | 11/1983 | Rushby et al. | 235/379 |
| 4,420,153 | A | 12/1983 | Winkler et al. | 271/304 |
| 4,423,316 | A | 12/1983 | Sano et al. | 235/379 |
| 4,434,359 | A | 2/1984 | Watanabe | 235/379 |
| 4,436,103 | A | 3/1984 | Dick | 133/3 D |
| 4,441,205 | A | 4/1984 | Berkin et al. | 382/8 |
| 4,442,541 | A | 4/1984 | Finkel et al. | 382/7 |
| 4,449,240 | A | 5/1984 | Yoshida | 382/15 |
| 4,454,414 | A | 6/1984 | Benton | 235/379 |
| 4,461,028 | A | 7/1984 | Okubo | 382/15 |
| 4,464,786 | A | 8/1984 | Nishito et al. | 382/7 |
| 4,464,787 | A | 8/1984 | Fish et al. | 382/7 |
| RE31,692 | E | 10/1984 | Tyburski et al. | 382/7 |
| 4,474,197 | A | 10/1984 | Kinoshita et al. | 133/4 A |
| 4,480,177 | A | 10/1984 | Allen | 235/379 |
| 4,487,306 | A | 12/1984 | Nao et al. | 194/4 |
| 4,488,116 | A | 12/1984 | Plesko | 324/236 |
| 4,490,846 | A | 12/1984 | Ishida et al. | 382/7 |
| 4,513,439 | A | 4/1985 | Gorgone et al. | 382/7 |
| 4,521,008 | A | 6/1985 | Granzow et al. | 271/3 |
| 4,523,087 | A | 6/1985 | Benton | 235/379 |
| 4,530,067 | A | 7/1985 | Dorr | 364/900 |
| 4,538,719 | A | 9/1985 | Gray et al. | 194/100 A |
| 4,539,702 | A | 9/1985 | Oka | 382/7 |
| 4,542,829 | A | 9/1985 | Emery et al. | 209/534 |
| 4,543,969 | A | 10/1985 | Rasmussen | 133/3 |
| 4,544,266 | A | 10/1985 | Antes | 356/71 |
| 4,547,896 | A | 10/1985 | Ohtombe et al. | 382/7 |
| 4,549,561 | A | 10/1985 | Johnson et al. | 133/3 |
| 4,553,222 | A | 11/1985 | Kurland et al. | 364/900 |
| 4,553,846 | A | 11/1985 | Hilton et al. | 356/429 |
| 4,556,140 | A | 12/1985 | Okada | 194/4 C |
| 4,558,224 | A | 12/1985 | Gober | |
| 4,558,711 | A | 12/1985 | Yoshiaki et al. | 133/3 F |
| 4,559,451 | A | 12/1985 | Curl | 250/560 |
| 4,563,771 | A | 1/1986 | Gorgone et al. | 382/7 |
| 4,564,036 | A | 1/1986 | Ristvedt | 133/3 |
| 4,567,370 | A | 1/1986 | Falls | |
| 4,569,421 | A | 2/1986 | Sandstedt | 186/39 |
| 4,570,655 | A | 2/1986 | Raterman | 133/3 |
| 4,582,172 | A | 4/1986 | Takeuchi et al. | 186/38 |
| 4,584,529 | A | 4/1986 | Aoyama | 324/261 |
| 4,587,412 | A | 5/1986 | Apisdorf | 235/449 |
| 4,587,434 | A | 5/1986 | Roes et al. | 250/556 |
| 4,590,606 | A | 5/1986 | Rohrer | 382/7 |
| 4,592,090 | A | 5/1986 | Curl et al. | 382/7 |
| 4,593,184 | A | 6/1986 | Bryce | |
| 4,594,664 | A | 6/1986 | Hashimoto | 364/405 |
| 4,602,332 | A | 7/1986 | Hirose et al. | 364/408 |
| D285,095 | S | 8/1986 | Lundgren et al. | D18/3 |
| 4,605,926 | A | 8/1986 | Onishi et al. | |
| 4,607,649 | A | 8/1986 | Taipale et al. | 133/3 C |
| 4,611,205 | A | 9/1986 | Eglise | |
| 4,611,345 | A | 9/1986 | Ohnishi et al. | 382/7 |
| 4,617,458 | A | 10/1986 | Bryce | 235/449 |
| 4,620,559 | A | 11/1986 | Childers et al. | 133/3 R |
| 4,622,456 | A | 11/1986 | Naruto et al. | 235/379 |
| 4,628,194 | A | 12/1986 | Dobbins et al. | 235/379 |
| 4,641,239 | A * | 2/1987 | Takesako | 705/41 |

4,645,936 A 2/1987 Gorgone ..... 250/556
4,653,647 A 3/1987 Hashimoto ..... 209/534
4,658,289 A 4/1987 Nagano et al. ..... 358/75
4,674,260 A 6/1987 Rasmussen et al. ..... 53/212
4,676,343 A 6/1987 Humble et al. ..... 186/61
4,677,682 A 6/1987 Miyagawa et al. ..... 382/7
4,678,072 A 7/1987 Kobayashi et al. ..... 194/206
4,681,128 A 7/1987 Ristvedt et al. ..... 453/6
4,685,141 A 8/1987 Hoque et al. ..... 382/7
4,686,357 A 8/1987 Douno et al. ..... 235/379
4,694,963 A 9/1987 Takesako ..... 209/534
4,697,071 A 9/1987 Hiraoka et al. ..... 235/379
4,700,368 A 10/1987 Munn et al. ..... 377/8
4,705,154 A 11/1987 Masho et al. ..... 194/319
4,706,577 A 11/1987 Jones ..... 109/59 T
4,716,456 A 12/1987 Hosaka ..... 358/75
4,718,218 A 1/1988 Ristvedt ..... 53/532
4,731,043 A 3/1988 Ristvedt et al. ..... 453/6
4,733,308 A 3/1988 Nakamura et al. ..... 358/496
4,733,765 A 3/1988 Watanabe ..... 194/206
4,735,289 A 4/1988 Kenyon ..... 186/37
4,743,743 A 5/1988 Fukatsu ..... 235/379
4,743,974 A 5/1988 Lockwood ..... 358/285
4,748,679 A 5/1988 Gold et al. ..... 382/61
4,749,074 A 6/1988 Ueki et al. ..... 194/317
4,749,087 A 6/1988 Buttifant ..... 209/534
4,753,624 A 6/1988 Adams et al. ..... 453/10
4,753,625 A 6/1988 Okada ..... 453/32
4,764,725 A 8/1988 Bryce ..... 324/234
4,764,976 A 8/1988 Kallin et al. ..... 382/65
4,765,464 A 8/1988 Ristvedt
4,766,548 A 8/1988 Cedrone et al. ..... 364/479
4,775,353 A 10/1988 Childers et al. ..... 453/6
4,775,354 A 10/1988 Rasmussen et al. ..... 453/10
4,778,983 A 10/1988 Ushikubo ..... 235/381
4,782,328 A 11/1988 Denlinger ..... 340/365
4,784,274 A 11/1988 Mori et al. ..... 209/534
4,803,347 A 2/1989 Sugahara et al. ..... 235/379
4,804,830 A 2/1989 Miyagisima et al. ..... 235/379
4,806,709 A 2/1989 Evans ..... 178/19
4,811,004 A 3/1989 Person et al. ..... 340/712
4,812,629 A 3/1989 O'Neil et al. ..... 235/383
4,817,176 A 3/1989 Marshall et al. ..... 382/43
4,821,332 A 4/1989 Durham ..... 382/7
4,823,393 A 4/1989 Kawakami ..... 382/7
4,825,246 A 4/1989 Fukuchi et al. ..... 355/4
4,827,531 A 5/1989 Milford ..... 382/7
4,833,307 A 5/1989 Gonzales-Justiz ..... 235/375
4,833,312 A 5/1989 Minematsu et al. ..... 235/379
4,837,842 A 6/1989 Holt ..... 382/26
4,839,505 A 6/1989 Bradt et al. ..... 235/381
4,841,358 A 6/1989 Kammoto et al. ..... 358/75
4,844,369 A 7/1989 Kanayachi ..... 242/56 R
4,848,556 A 7/1989 Shah et al. ..... 194/212
4,851,616 A 7/1989 Wales et al. ..... 178/18
4,863,414 A 9/1989 Ristvedt et al. ..... 453/6
4,877,230 A 10/1989 Winkler et al. ..... 271/3
4,880,096 A 11/1989 Kobayashi et al. ..... 194/206
4,881,268 A 11/1989 Uchida et al. ..... 382/7
4,883,158 A 11/1989 Kobayashi et al. ..... 194/217
4,883,181 A 11/1989 Yoshikawa ..... 209/534
4,884,212 A 11/1989 Stutsman ..... 364/479
4,888,812 A 12/1989 Dinan et al. ..... 382/7
4,900,909 A 2/1990 Nagashima et al. ..... 235/487
4,903,953 A 2/1990 Winkler et al. ..... 271/4
4,905,839 A 3/1990 Yuge et al. ..... 209/534
4,905,840 A 3/1990 Yuge et al. ..... 209/534
4,908,516 A 3/1990 West ..... 250/556
4,921,463 A 5/1990 Primdahl et al. ..... 453/3
4,922,109 A 5/1990 Bercovitz et al. ..... 194/207
4,928,094 A 5/1990 Smith ..... 340/712
4,931,782 A 6/1990 Jackson ..... 340/706
4,936,435 A 6/1990 Griner ..... 194/317
4,947,441 A 8/1990 Hara et al. ..... 382/7
4,953,086 A 8/1990 Fukatsu ..... 364/408
4,954,697 A 9/1990 Kokubun et al. ..... 235/381
4,964,495 A 10/1990 Rasmussen ..... 194/344
4,966,570 A 10/1990 Ristvedt et al. ..... 453/6
4,970,655 A 11/1990 Winn et al. ..... 364/479
4,971,187 A 11/1990 Furuya et al. ..... 194/318
4,973,851 A 11/1990 Lee ..... 250/556
4,980,543 A 12/1990 Hara et al. ..... 209/534
4,988,849 A 1/1991 Sasaki et al. ..... 235/379
4,992,647 A 2/1991 Konishi et al. ..... 235/379
4,992,860 A 2/1991 Hamaguchi et al. ..... 358/75
4,995,848 A 2/1991 Goh ..... 453/3
4,996,604 A 2/1991 Oqawa et al. ..... 358/486
5,009,627 A 4/1991 Rasmussen ..... 453/10
5,010,238 A 4/1991 Kadono et al. ..... 235/379
5,010,485 A 4/1991 Bigari ..... 364/408
5,010,782 A 4/1991 Asano et al.
5,011,455 A 4/1991 Rasmussen ..... 453/10
5,022,889 A 6/1991 Ristvedt et al. ..... 453/6
5,023,782 A 6/1991 Lutz et al. ..... 364/405
5,025,139 A 6/1991 Halliburton, Jr. ..... 235/379
5,026,320 A 6/1991 Rasmussen ..... 453/6
5,027,415 A 6/1991 Hara et al. ..... 382/7
5,031,098 A 7/1991 Miller et al. ..... 364/405
5,033,602 A 7/1991 Saarinen et al. ..... 194/334
5,039,848 A 8/1991 Stoken ..... 235/381
5,040,226 A 8/1991 Elischer et al. ..... 382/7
5,047,871 A 9/1991 Meyer et al. ..... 358/486
5,054,621 A 10/1991 Murphy et al. ..... 209/534
5,055,086 A 10/1991 Raterman et al. ..... 453/10
5,055,657 A 10/1991 Miller et al. ..... 235/381
5,055,834 A 10/1991 Chiba ..... 340/825
5,063,599 A 11/1991 Concannon et al. ..... 382/7
5,064,999 A 11/1991 Okamoto et al. ..... 235/379
5,068,519 A 11/1991 Bryce ..... 235/449
5,076,441 A 12/1991 Gerlier ..... 209/534
5,080,633 A 1/1992 Ristvedt et al. ..... 435/6
5,091,713 A 2/1992 Horne et al. ..... 340/541
5,091,961 A 2/1992 Baus, Jr. ..... 382/7
5,104,353 A 4/1992 Ristvedt et al. ..... 453/6
5,105,601 A 4/1992 Horiguchi et al. ..... 53/465
5,106,338 A 4/1992 Rasmussen et al. ..... 453/10
5,111,927 A 5/1992 Schulze ..... 194/209
5,114,381 A 5/1992 Ueda et al. ..... 453/57
5,120,944 A 6/1992 Kern et al. ..... 235/379
5,120,945 A 6/1992 Nishibe et al. ..... 235/379
5,122,754 A 6/1992 Gotaas ..... 324/676
5,123,873 A 6/1992 Rasmussen ..... 453/10
5,129,205 A 7/1992 Rasmussen ..... 53/52
5,134,663 A 7/1992 Kozlowski ..... 382/7
5,135,115 A 8/1992 Miller et al. ..... 209/564
5,135,435 A 8/1992 Rasmussen ..... 453/56
5,140,517 A 8/1992 Nagata et al. ..... 364/408
5,141,443 A 8/1992 Rasmussen et al. ..... 453/10
5,141,472 A 8/1992 Todd et al. ..... 453/10
5,144,115 A 9/1992 Yoshida ..... 235/379
5,145,455 A 9/1992 Todd ..... 453/6
5,146,067 A 9/1992 Sloan et al. ..... 235/381
5,146,512 A 9/1992 Weideman et al. ..... 382/30
5,151,607 A 9/1992 Crane et al. ..... 250/556
5,154,272 A 10/1992 Nishiumi et al. ..... 194/318
5,159,548 A 10/1992 Caslavka ..... 364/408
5,163,672 A 11/1992 Mennie ..... 271/187
5,163,866 A 11/1992 Rasmussen ..... 453/10
5,163,867 A 11/1992 Rasmussen ..... 453/10
5,163,868 A 11/1992 Adams et al. ..... 453/11
5,167,313 A 12/1992 Dobbins et al. ..... 194/317
5,175,416 A 12/1992 Mansvelt et al. ..... 235/379
5,176,565 A 1/1993 Ristvedt et al. ..... 453/6
5,179,517 A 1/1993 Sarbin et al. ..... 364/410
5,183,142 A 2/1993 Latchinian et al. ..... 194/206
5,184,115 A 2/1993 Black et al. ..... 340/708
5,184,709 A 2/1993 Nishiumi et al. ..... 194/318
5,186,334 A 2/1993 Fukudome et al. ..... 209/534
5,187,750 A 2/1993 Behera ..... 382/7
5,193,121 A 3/1993 Elischer et al. ..... 382/7
5,194,037 A 3/1993 Jones et al. ..... 453/10
5,197,919 A 3/1993 Geib et al. ..... 453/10
5,198,976 A 3/1993 Form et al. ..... 364/410
5,199,543 A 4/1993 Kamagami et al. ..... 194/207
5,201,395 A 4/1993 Takizawa et al. ..... 194/206
5,205,780 A 4/1993 Rasmussen ..... 453/10
5,207,784 A 5/1993 Schwartzendruber ..... 221/6
5,207,788 A 5/1993 Geib et al. ..... 271/122

5,209,696 A 5/1993 Rasmussen et al. ..... 453/10
5,231,381 A 7/1993 Duwaer ..... 340/712
5,236,071 A 8/1993 Lee ..... 194/200
5,237,158 A 8/1993 Kern et al. ..... 235/379
5,239,593 A 8/1993 Wittner et al. ..... 382/14
5,243,174 A 9/1993 Veeneman et al. ..... 235/381
5,251,738 A 10/1993 Dabrowski ..... 194/206
5,252,167 A 10/1993 Yoshida et al. ..... 364/408
5,252,811 A 10/1993 Henochowicz et al. ..... 235/379
5,253,167 A 10/1993 Yoshida et al. ..... 364/408
5,261,518 A 11/1993 Bryce ..... 194/206
5,263,566 A 11/1993 Nara et al. ..... 194/318
5,265,008 A 11/1993 Benton et al. ..... 364/408
5,265,874 A 11/1993 Dickinson et al. ..... 273/138 A
5,268,561 A 12/1993 Kimura et al. ..... 235/384
5,277,651 A 1/1994 Rasmussen et al. ..... 453/10
5,279,403 A 1/1994 Harbaugh et al. ..... 194/207
5,282,127 A 1/1994 Mii ..... 364/130
5,286,226 A 2/1994 Rasmussen ..... 453/10
5,286,954 A 2/1994 Sato et al. ..... 235/379
5,291,003 A 3/1994 Avnet et al. ..... 235/381
5,291,560 A 3/1994 Daugman ..... 382/2
5,293,981 A 3/1994 Abe et al. ..... 194/345
5,295,196 A 3/1994 Raterman et al. ..... 382/135
5,297,030 A 3/1994 Vassigh et al. ..... 364/405
5,297,598 A 3/1994 Rasmussen ..... 141/314
5,297,986 A 3/1994 Ristvedt et al. ..... 453/6
5,299,977 A 4/1994 Mazur et al. ..... 453/10
5,302,811 A 4/1994 Fukatsu ..... 235/381
5,304,813 A 4/1994 DeMan ..... 250/556
5,308,992 A 5/1994 Crane et al. ..... 250/556
5,309,515 A 5/1994 Troung et al. ..... 382/7
5,317,140 A 5/1994 Dunthorn ..... 250/221
5,321,238 A 6/1994 Kamata et al. ..... 235/379
5,324,922 A 6/1994 Roberts ..... 235/375
5,326,104 A 7/1994 Pease et al. ..... 273/138 A
5,335,292 A 8/1994 Lovelady et al. ..... 382/17
5,341,408 A 8/1994 Melcher et al. ..... 377/8
5,342,165 A 8/1994 Graef et al.
5,363,949 A 11/1994 Matsubayashi ..... 194/206
5,367,577 A 11/1994 Gotaas ..... 382/7
5,368,147 A 11/1994 Menke et al. ..... 194/206
5,370,575 A 12/1994 Geib et al. ..... 453/3
5,371,345 A 12/1994 LeStrange et al. ..... 235/380
5,371,798 A 12/1994 McWhortor ..... 380/51
5,372,542 A 12/1994 Geib et al. ..... 453/10
5,373,550 A 12/1994 Campbell et al. ..... 379/100
5,374,814 A 12/1994 Kako et al. ..... 235/379
5,379,344 A 1/1995 Larson et al. ..... 380/23
5,379,875 A 1/1995 Shames et al. ..... 194/317
5,381,019 A 1/1995 Sato ..... 250/556
5,382,191 A 1/1995 Rasmussen ..... 453/11
5,390,776 A 2/1995 Thompson ..... 194/346
5,394,969 A 3/1995 Harbaugh ..... 194/206
5,399,874 A 3/1995 Gonsalves et al. ..... 250/556
5,401,211 A 3/1995 Geib et al. ..... 453/10
5,402,895 A 4/1995 Mikkelsen et al. ..... 209/534
5,404,986 A 4/1995 Hossfield et al. ..... 194/317
5,410,590 A 4/1995 Blood et al. ..... 379/147
RE34,934 E 5/1995 Raterman et al. ..... 453/10
5,417,316 A 5/1995 Harbaugh ..... 194/206
5,418,458 A 5/1995 Jeffers ..... 324/235
5,419,424 A 5/1995 Harbaugh ..... 194/206
5,421,443 A 6/1995 Hatamachie et al. ..... 914/206
5,425,669 A 6/1995 Geib et al. ..... 453/10
5,429,550 A 7/1995 Mazur et al. ..... 453/10
5,430,664 A 7/1995 Cargill et al. ..... 364/550
5,434,427 A 7/1995 Crane et al. ..... 250/556
5,437,357 A 8/1995 Ota et al. ..... 194/206
5,438,184 A 8/1995 Roberts et al. ..... 235/380
5,440,108 A 8/1995 Tran et al. ..... 235/381
5,444,793 A 8/1995 Kelland ..... 382/138
5,444,794 A 8/1995 Uhland, Sr. ..... 382/137
5,450,938 A 9/1995 Rademacher ..... 194/206
5,453,047 A 9/1995 Mazur et al. ..... 453/10
5,453,601 A 9/1995 Rosen ..... 235/379
5,459,304 A 10/1995 Eisenmann ..... 235/380
5,465,301 A 11/1995 Jotcham et al. ..... 380/54
5,465,821 A 11/1995 Akioka ..... 194/207
5,467,405 A 11/1995 Raterman et al. ..... 382/135
5,467,406 A 11/1995 Graves et al. ..... 382/135
5,468,182 A 11/1995 Geib ..... 453/10
5,468,971 A 11/1995 Ebstein et al. ..... 250/556
5,470,079 A 11/1995 LeStrange et al. ..... 273/138 A
5,474,495 A 12/1995 Geib et al. ..... 453/3
5,474,497 A 12/1995 Jones et al. ..... 453/17
5,476,169 A 12/1995 Takarada et al. ..... 194/207
5,480,348 A 1/1996 Mazur et al. ..... 453/10
5,481,377 A 1/1996 Udagawa et al. ..... 358/501
5,486,067 A 1/1996 Huynh et al.
5,488,671 A 1/1996 Kern ..... 382/138
5,489,237 A 2/1996 Geib et al. ..... 453/12
5,500,514 A 3/1996 Veeneman et al. ..... 235/381
5,501,631 A 3/1996 Mennie et al. ..... 453/3
5,504,822 A 4/1996 Holt ..... 382/218
5,506,691 A 4/1996 Bednar et al. ..... 358/402
5,507,379 A 4/1996 Mazur et al. ..... 194/318
D369,984 S 5/1996 Larsen ..... D10/97
5,514,034 A 5/1996 Jones et al. ..... 453/10
5,520,577 A 5/1996 Rasmussen ..... 453/56
5,523,575 A 6/1996 Machida et al.
5,530,772 A 6/1996 Storey ..... 382/135
5,537,486 A 7/1996 Stratigos et al. ..... 382/137
5,538,468 A 7/1996 Ristvedt et al. ..... 453/3
5,542,880 A 8/1996 Geib et al. ..... 453/10
5,542,881 A 8/1996 Geib ..... 453/10
5,544,043 A 8/1996 Miki et al. ..... 364/406
5,544,086 A 8/1996 Davis et al. ..... 705/68
5,545,885 A 8/1996 Jagielinski ..... 235/449
5,553,320 A 9/1996 Matsuura et al. ..... 235/379
5,559,887 A 9/1996 Davis et al. ..... 380/24
5,564,546 A 10/1996 Molbak et al. ..... 194/216
5,564,974 A 10/1996 Mazur et al. ..... 453/10
5,564,978 A 10/1996 Jones et al. ..... 453/17
5,570,465 A 10/1996 Tsakanikas ..... 395/114
5,573,457 A 11/1996 Watts et al. ..... 453/31
5,584,758 A 12/1996 Geib ..... 453/10
5,584,763 A 12/1996 Kelly et al. ..... 463/16
5,586,036 A 12/1996 Pintsov ..... 364/464
5,592,377 A 1/1997 Lipkin ..... 395/242
5,600,732 A 2/1997 Ott et al. ..... 382/112
5,602,933 A 2/1997 Blackwell et al. ..... 382/116
5,602,936 A 2/1997 Green et al. ..... 382/140
5,607,040 A 3/1997 Mathurin, Sr. ..... 194/207
5,611,377 A * 3/1997 Maguire ..... 141/98
5,615,280 A 3/1997 Izawa et al. ..... 382/135
5,620,079 A * 4/1997 Molbak ..... 194/217
5,623,427 A 4/1997 Jones et al. ..... 705/68
5,623,547 A 4/1997 Jones et al. ..... 380/24
5,625,562 A 4/1997 Veeneman et al. ..... 364/479.05
5,630,494 A 5/1997 Strauts ..... 194/317
5,633,949 A 5/1997 Graves et al. ..... 382/135
5,637,845 A 6/1997 Kolls ..... 235/381
5,640,463 A 6/1997 Csulits ..... 382/135
5,641,050 A 6/1997 Smith et al. ..... 194/210
5,650,605 A 7/1997 Morioka et al. ..... 235/379
5,650,761 A 7/1997 Gomm et al. ..... 235/381
5,652,421 A 7/1997 Veeneman et al. ..... 235/381
5,652,802 A 7/1997 Graves et al. ..... 382/135
5,657,846 A 8/1997 Schwartz ..... 194/206
5,665,952 A 9/1997 Ziarno ..... 235/380
5,678,046 A 10/1997 Cahill et al. ..... 395/616
5,679,070 A 10/1997 Ishida et al. ..... 453/41
5,680,472 A 10/1997 Conant ..... 382/135
5,684,597 A 11/1997 Hossfield et al. ..... 356/384
5,687,963 A 11/1997 Mennie ..... 271/119
5,692,067 A 11/1997 Raterman et al. ..... 382/135
5,696,366 A 12/1997 Ziarno ..... 235/380
5,704,491 A 1/1998 Graves ..... 209/534
5,719,948 A 2/1998 Liang ..... 382/112
5,724,438 A 3/1998 Graves ..... 382/135
5,727,667 A 3/1998 Nye ..... 194/207
5,729,623 A 3/1998 Omatu et al. ..... 382/155
5,743,373 A 4/1998 Strauts ..... 194/318
5,746,299 A 5/1998 Molbak et al. ..... 194/200
5,751,840 A 5/1998 Raterman et al. ..... 382/135
5,751,842 A 5/1998 Riach et al. ..... 382/137
5,754,673 A 5/1998 Brooks et al. ..... 382/112

5,761,089 A 6/1998 Mcinerny ..... 364/550
5,774,874 A 6/1998 Veeneman et al. ..... 705/27
5,781,654 A 7/1998 Carney ..... 382/137
5,782,686 A 7/1998 Geib et al. ..... 453/10
5,788,573 A 8/1998 Baerlocher et al. ..... 463/16
5,790,693 A 8/1998 Graves et al. ..... 382/135
5,790,697 A 8/1998 Munro et al. ..... 382/135
5,799,767 A 9/1998 Molbak ..... 194/217
5,806,650 A 9/1998 Mennie et al. ..... 194/206
5,813,510 A 9/1998 Rademacher ..... 194/206
5,815,592 A 9/1998 Mennie et al. ..... 382/135
5,822,448 A 10/1998 Graves et al. ..... 382/135
5,823,315 A 10/1998 Hoffman et al. ..... 194/203
5,823,874 A 10/1998 Adams ..... 463/17
5,830,054 A 11/1998 Petri ..... 453/5
5,832,104 A 11/1998 Graves et al. ..... 382/135
5,832,463 A 11/1998 Funk ..... 705/35
5,838,812 A 11/1998 Pare, Jr. et al. ..... 382/115
5,842,188 A 11/1998 Ramsey et al. ..... 705/416
5,842,916 A 12/1998 Gerrity et al. ..... 453/57
5,850,076 A 12/1998 Morioka et al. ..... 235/379
5,852,811 A 12/1998 Atkins ..... 705/36
5,854,581 A 12/1998 Mori et al. ..... 235/379
5,865,673 A 2/1999 Geib et al. ..... 453/10
5,867,589 A 2/1999 Graves et al. ..... 382/135
5,870,487 A 2/1999 Graves et al. ..... 382/135
5,875,259 A 2/1999 Mennie et al. ..... 382/135
5,880,444 A 3/1999 Shibata et al. ..... 235/379
5,892,211 A 4/1999 Davis et al. ..... 235/380
5,892,827 A 4/1999 Beach et al. ..... 380/24
5,905,810 A 5/1999 Jones et al. ..... 382/135
5,909,502 A 6/1999 Mazur ..... 382/135
5,909,503 A 6/1999 Graves et al. ..... 382/135
5,909,793 A 6/1999 Beach et al. ..... 194/210
5,909,794 A 6/1999 Molbak et al. ..... 194/216
5,912,982 A 6/1999 Munro et al. ..... 382/135
5,913,399 A 6/1999 Takemoto et al. ..... 194/200
5,918,748 A 7/1999 Clark et al. ..... 209/534
5,926,550 A 7/1999 Davis ..... 380/25
5,938,044 A 8/1999 Weggesser ..... 209/534
5,940,623 A 8/1999 Watts et al. ..... 395/712
5,940,844 A 8/1999 Cahill et al. ..... 707/526
5,943,655 A 8/1999 Jacobsen ..... 705/30
5,944,600 A 8/1999 Zimmermann ..... 435/10
5,947,255 A 9/1999 Shimada et al. ..... 194/207
5,951,476 A 9/1999 Beach et al. ..... 600/437
5,957,262 A 9/1999 Molbak et al. ..... 194/200
5,960,103 A 9/1999 Graves et al. ..... 382/135
5,966,456 A 10/1999 Jones et al. ..... 382/135
5,978,772 A * 11/1999 Mold ..... 705/16
5,982,918 A 11/1999 Mennie et al. ..... 382/135
5,988,348 A 11/1999 Martin et al. ..... 194/317
5,992,601 A 11/1999 Mennie et al. ..... 194/207
5,995,949 A 11/1999 Morioka et al. ..... 705/43
5,997,395 A 12/1999 Geib et al. ..... 453/10
6,012,565 A 1/2000 Mazur ..... 194/207
6,017,270 A 1/2000 Ristvedt et al. ..... 453/5
6,021,883 A 2/2000 Casanova et al. ..... 194/217
6,023,684 A 2/2000 Pearson ..... 705/35
6,026,175 A 2/2000 Raterman et al. ..... 382/135
6,028,951 A 2/2000 Raterman et al. ..... 382/135
D422,016 S 3/2000 Forslund ..... D18/3
6,032,859 A 3/2000 Muehlberger et al. ..... 235/449
6,038,553 A 3/2000 Hyde, Jr. ..... 705/45
6,039,644 A 3/2000 Geib et al. ..... 453/10
6,039,645 A 3/2000 Mazur ..... 453/10
6,042,470 A 3/2000 Geib et al. ..... 453/10
6,047,807 A 4/2000 Molbak ..... 194/217
6,047,808 A 4/2000 Neubarth et al. ..... 194/317
6,056,104 A 5/2000 Neubarth et al. ..... 194/317
6,068,194 A 5/2000 Mazur ..... 235/492
6,072,896 A 6/2000 Graves et al. ..... 382/135
6,073,744 A 6/2000 Raterman et al. ..... 194/207
6,074,334 A 6/2000 Mennie et al. ..... 493/438
6,080,056 A 6/2000 Karlsson ..... 453/3
D427,623 S 7/2000 Kuwada et al. ..... D18/3
6,082,519 A 7/2000 Martin et al. ..... 194/350
6,086,471 A 7/2000 Zimmermann ..... 453/3
6,095,313 A 8/2000 Molbak et al. ..... 194/344
6,116,402 A * 9/2000 Beach et al. ..... 194/216
6,128,402 A 10/2000 Jones et al. ..... 382/135
6,131,625 A 10/2000 Casanova et al. ..... 141/314
6,139,418 A 10/2000 Geib et al. ..... 453/10
6,142,285 A 11/2000 Panzeri et al. ..... 194/328
6,145,738 A 11/2000 Stinson et al. ..... 235/379
6,154,879 A 11/2000 Pare, Jr. et al. ..... 902/3
6,168,001 B1 1/2001 Davis ..... 194/200
6,171,182 B1 1/2001 Geib et al. ..... 453/10
6,174,230 B1 1/2001 Gerrity et al. ..... 453/57
6,196,371 B1 3/2001 Martin et al. ..... 194/317
6,196,913 B1 3/2001 Geib et al. ..... 453/10
6,220,419 B1 4/2001 Mennie ..... 194/207
6,230,928 B1 5/2001 Hanna et al. ..... 221/13
6,237,565 B1 5/2001 Engelgau
6,237,739 B1 5/2001 Mazur et al. ..... 194/207
6,241,069 B1 6/2001 Mazur et al. ..... 194/207
6,256,407 B1 7/2001 Mennie et al. ..... 382/135
6,264,545 B1 7/2001 Magee et al. ..... 453/3
6,270,411 B1 8/2001 Gura et al. ..... 463/20
6,278,795 B1 8/2001 Anderson et al. ..... 382/135
6,283,366 B1 9/2001 Hills et al. ..... 235/379
6,308,887 B1 10/2001 Korman et al. ..... 235/379
6,311,819 B1 11/2001 Stromme et al. ..... 194/207
6,315,660 B1 11/2001 DeMar et al. ..... 463/16
6,318,536 B1 * 11/2001 Korman et al. ..... 194/217
6,318,537 B1 11/2001 Jones et al. ..... 194/346
6,322,309 B1 11/2001 Thomas et al. ..... 413/20
6,349,972 B1 * 2/2002 Geiger et al. ..... 283/67
6,351,551 B1 2/2002 Munro et al. ..... 382/135
6,354,491 B2 3/2002 Nichols et al. ..... 235/379
6,363,164 B1 3/2002 Jones et al. ..... 382/135
6,371,303 B1 4/2002 Klein et al. ..... 209/534
6,378,683 B2 4/2002 Mennie ..... 194/207
6,381,354 B1 4/2002 Mennie et al. ..... 382/135
6,398,000 B1 6/2002 Jenrick et al. ..... 194/200
6,412,620 B1 7/2002 Imura ..... 194/317
6,431,342 B1 8/2002 Schwartz ..... 194/346
6,438,230 B1 8/2002 Moore ..... 380/42
6,456,928 B1 9/2002 Johnson ..... 701/114
6,459,806 B1 10/2002 Raterman et al. ..... 382/135
6,460,705 B1 10/2002 Hallowell ..... 209/534
6,471,030 B1 10/2002 Neubarth et al. ..... 194/317
6,473,519 B1 10/2002 Pidhirny et al. ..... 382/140
6,474,548 B1 11/2002 Montross et al. ..... 235/379
6,484,863 B1 11/2002 Molbak ..... 194/216
6,484,884 B1 11/2002 Gerrity et al. ..... 209/233
6,493,461 B1 12/2002 Mennie et al. ..... 382/135
6,494,776 B1 12/2002 Molbak ..... 453/32
6,499,277 B1 12/2002 Warner et al. ..... 53/447
6,503,138 B2 1/2003 Spoehr et al. ..... 453/10
6,511,377 B1 * 1/2003 Weiss ..... 463/25
6,520,308 B1 2/2003 Martin et al. ..... 194/317
6,522,772 B1 2/2003 Morrison et al. ..... 382/124
6,539,104 B1 3/2003 Raterman et al. ..... 382/135
6,547,131 B1 4/2003 Foodman et al. ..... 235/380
6,552,781 B1 4/2003 Rompel et al. ..... 256/71
6,554,185 B1 4/2003 Montross et al. ..... 235/379
6,560,355 B2 5/2003 Graves et al. ..... 382/135
6,579,165 B2 6/2003 Kuhlin et al. ..... 453/3
6,581,042 B2 6/2003 Pare, Jr. et al. ..... 705/40
6,588,569 B1 7/2003 Jenrick et al. ..... 194/206
6,595,342 B1 * 7/2003 Maritzen et al. ..... 194/212
6,601,687 B1 8/2003 Jenrick et al. ..... 194/206
6,602,125 B2 8/2003 Martin ..... 453/12
6,603,872 B2 8/2003 Jones et al. ..... 382/135
6,609,604 B1 8/2003 Jones et al. ..... 194/302
6,612,921 B2 9/2003 Geib et al. ..... 453/13
6,621,919 B2 9/2003 Mennie et al. ..... 382/135
6,628,816 B2 9/2003 Mennie et al. ..... 382/135
6,636,624 B2 10/2003 Raterman et al. ..... 382/135
6,637,576 B1 10/2003 Jones et al. ..... 194/216
6,640,956 B1 11/2003 Zwieg et al. ..... 194/328
6,644,696 B2 11/2003 Brown et al. ..... 283/67
6,647,136 B2 11/2003 Jones et al. ..... 382/137
6,650,767 B2 11/2003 Jones et al. ..... 382/135
6,654,486 B2 11/2003 Jones et al. ..... 382/135
6,655,585 B2 12/2003 Shinn ..... 235/382
6,659,259 B2 12/2003 Knox et al. ..... 194/217

6,661,910 B2 12/2003 Jones et al. ..... 382/135
6,662,166 B2 12/2003 Pare, Jr. et al. ..... 705/39
6,663,675 B2 12/2003 Blake et al. ..... 753/63
6,665,431 B2 12/2003 Jones et al. ..... 382/135
6,666,318 B2 12/2003 Gerrity et al. ..... 194/347
6,678,401 B2 1/2004 Jones et al. ..... 382/135
6,678,402 B2 1/2004 Jones et al. ..... 382/135
6,705,470 B2 3/2004 Klein et al. ..... 209/534
6,721,442 B1 4/2004 Mennie et al. ..... 382/135
6,724,926 B2 4/2004 Jones et al. ..... 382/135
6,724,927 B2 4/2004 Jones et al. ..... 382/135
6,731,785 B1 5/2004 Mennie et al. ..... 382/135
6,731,786 B2 5/2004 Jones et al. ..... 382/135
6,736,251 B2 * 5/2004 Molbak ..... 194/347
6,748,101 B1 * 6/2004 Jones et al. ..... 382/135
6,754,636 B1 * 6/2004 Walker et al. ..... 705/26
6,755,730 B2 6/2004 Geib et al. ..... 453/3
6,758,316 B2 7/2004 Molbak ..... 194/200
6,761,308 B1 7/2004 Hanna et al. ..... 235/379
6,766,892 B2 7/2004 Martin et al. ..... 194/317
6,778,693 B2 8/2004 Jones et al. ..... 382/135
6,783,452 B2 8/2004 Hino et al. ..... 453/3
6,783,785 B1 8/2004 Raghavan et al. ..... 426/489
6,786,398 B1 9/2004 Stinson et al. ..... 235/379
6,798,899 B2 9/2004 Mennie et al. ..... 382/135
6,810,137 B2 10/2004 Jones et al. ..... 382/135
6,843,418 B2 1/2005 Jones et al. ..... 235/462.01
6,854,581 B2 2/2005 Molbak ..... 194/344
6,854,640 B2 2/2005 Peklo ..... 235/100
6,860,375 B2 3/2005 Hallowell et al. ..... 194/207
6,866,134 B2 3/2005 Stromme et al. ..... 194/207
6,868,954 B2 3/2005 Stromme et al. ..... 194/207
6,880,692 B1 4/2005 Mazur et al. ..... 194/207
6,892,182 B1 * 5/2005 Rowe et al. ..... 705/14
6,892,871 B2 5/2005 Strauts et al. ..... 194/302
6,896,118 B2 5/2005 Jones et al. ..... 194/217
6,913,130 B1 7/2005 Mazur et al. ..... 194/207
6,913,260 B2 7/2005 Maier et al. ..... 271/265.04
6,915,893 B2 7/2005 Mennie et al.
6,923,721 B2 * 8/2005 Luciano et al. ..... 463/24
6,928,546 B1 8/2005 Nanavati et al. ..... 713/186
6,929,109 B1 8/2005 Klein et al. ..... 194/206
6,950,810 B2 9/2005 Lapsley et al. ..... 705/78
6,955,253 B1 10/2005 Mazur et al. ..... 194/207
6,957,733 B2 10/2005 Mazur et al.
6,959,800 B1 11/2005 Mazur et al. ..... 194/207
6,962,247 B2 11/2005 Maier et al. ..... 194/207
6,980,684 B1 12/2005 Munro et al. ..... 382/135
6,991,530 B2 1/2006 Hino et al. ..... 453/3
6,994,200 B2 2/2006 Jenrick et al. ..... 194/206
6,996,263 B2 2/2006 Jones et al.
7,000,828 B2 2/2006 Jones et al.
7,004,831 B2 2/2006 Hino et al.
7,014,029 B2 3/2006 Winters ..... 194/302
7,016,767 B2 3/2006 Jones et al. ..... 700/224
7,028,827 B1 4/2006 Molbak et al. ..... 194/346
7,082,216 B2 7/2006 Jones et al. ..... 382/137
7,092,560 B2 8/2006 Jones et al. ..... 382/135
7,103,206 B2 9/2006 Graves et al.
7,103,438 B2 9/2006 Hallowell et al. ..... 700/116
7,113,929 B1 * 9/2006 Beach et al. ..... 705/65
7,125,335 B2 * 10/2006 Rowe ..... 463/25
7,146,245 B2 12/2006 Jones et al. ..... 700/224
7,149,336 B2 12/2006 Jones et al. ..... 382/135
7,152,727 B2 12/2006 Waechter ..... 194/317
7,158,662 B2 1/2007 Chiles ..... 382/135
7,171,032 B2 1/2007 Jones et al. ..... 382/135
7,187,795 B2 3/2007 Jones et al.
7,191,657 B2 3/2007 Maier et al. ..... 73/587
7,197,173 B2 3/2007 Jones et al. ..... 382/135
7,200,255 B2 4/2007 Jones et al. ..... 382/135
7,201,320 B2 4/2007 Csulits et al. ..... 235/462.01
7,232,024 B2 6/2007 Mazur et al. ..... 194/207
7,248,731 B2 7/2007 Raterman et al. ..... 382/135
7,256,874 B2 8/2007 Csulits et al. ..... 356/71
7,272,570 B2 * 9/2007 Sadler ..... 705/16
7,349,566 B2 3/2008 Jones et al.
7,580,859 B2 8/2009 Economy
2001/0006557 A1 7/2001 Mennie et al. ..... 382/135
2001/0015311 A1 8/2001 Mennie ..... 194/207
2001/0019624 A1 9/2001 Raterman et al. ..... 382/135
2001/0034203 A1 10/2001 Geib et al. ..... 453/3
2001/0035603 A1 11/2001 Graves et al. ..... 271/265.01
2001/0048025 A1 12/2001 Shinn ..... 235/382
2002/0001393 A1 1/2002 Jones et al. ..... 382/100
2002/0020603 A1 2/2002 Jones et al. ..... 194/346
2002/0056605 A1 5/2002 Mazur et al. ..... 194/207
2002/0065033 A1 5/2002 Geib et al. ..... 453/3
2002/0069104 A1 6/2002 Beach et al. ..... 705/14
2002/0074209 A1 6/2002 Karlsson ..... 194/330
2002/0085245 A1 7/2002 Mennie et al. ..... 358/498
2002/0085745 A1 7/2002 Jones et al. ..... 382/135
2002/0095587 A1 7/2002 Doyle et al. ..... 713/186
2002/0103757 A1 8/2002 Jones et al. ..... 705/45
2002/0104785 A1 8/2002 Klein et al. ..... 209/534
2002/0107738 A1 8/2002 Beach et al. ..... 705/14
2002/0107801 A1 8/2002 Jones et al. ..... 705/45
2002/0118871 A1 8/2002 Jones et al. ..... 382/137
2002/0122580 A1 9/2002 Jones et al. ..... 382/137
2002/0126885 A1 9/2002 Mennie et al. ..... 382/135
2002/0126886 A1 9/2002 Jones et al. ..... 382/135
2002/0130011 A1 9/2002 Casanova et al. ..... 194/344
2002/0131630 A1 9/2002 Jones et al. ..... 382/137
2002/0136442 A1 9/2002 Jones et al. ..... 382/135
2002/0145035 A1 10/2002 Jones ..... 235/379
2002/0147588 A1 10/2002 Davis et al. ..... 704/246
2002/0151267 A1 10/2002 Kuhlin et al. ..... 453/3
2002/0154804 A1 10/2002 Jones et al. ..... 382/135
2002/0154805 A1 10/2002 Jones et al. ..... 382/135
2002/0154806 A1 10/2002 Jones et al. ..... 382/135
2002/0154807 A1 10/2002 Jones et al. ..... 382/135
2002/0154808 A1 10/2002 Jones et al. ..... 382/135
2002/0174348 A1 11/2002 Ting ..... 713/186
2002/0179401 A1 12/2002 Knox et al. ..... 194/217
2002/0186876 A1 12/2002 Jones et al. ..... 382/135
2003/0004878 A1 1/2003 Akutsu et al. ..... 705/43
2003/0009420 A1 1/2003 Jones ..... 705/39
2003/0013403 A1 1/2003 Blake et al. ..... 453/60
2003/0015395 A1 1/2003 Hallowell et al. ..... 194/206
2003/0015396 A1 1/2003 Mennie ..... 194/206
2003/0059098 A1 3/2003 Jones et al. ..... 382/135
2003/0062242 A1 4/2003 Hallowell et al. ..... 194/302
2003/0078094 A1 * 4/2003 Gatto et al. ..... 463/25
2003/0081824 A1 5/2003 Mennie et al. ..... 382/135
2003/0108233 A1 6/2003 Raterman et al. ..... 382/135
2003/0121752 A1 7/2003 Stromme et al. ..... 194/207
2003/0121753 A1 7/2003 Stromme et al. ..... 194/207
2003/0127299 A1 7/2003 Jones et al. ..... 194/217
2003/0132281 A1 7/2003 Jones et al. ..... 235/379
2003/0139994 A1 7/2003 Jones ..... 705/36
2003/0168308 A1 9/2003 Maier et al. ..... 194/207
2003/0168309 A1 9/2003 Geib et al. ..... 194/302
2003/0168310 A1 9/2003 Strauts et al. ..... 194/302
2003/0174874 A1 9/2003 Raterman et al. ..... 382/135
2003/0182217 A1 9/2003 Chiles ..... 705/35
2003/0198373 A1 10/2003 Raterman et al. ..... 382/135
2003/0202690 A1 10/2003 Jones et al. ..... 382/139
2004/0003980 A1 1/2004 Hallowell et al. ..... 194/206
2004/0016621 A1 1/2004 Jenrick et al. ..... 194/206
2004/0016797 A1 1/2004 Jones et al. ..... 235/379
2004/0028266 A1 2/2004 Jones et al. ..... 382/135
2004/0039635 A1 * 2/2004 Linde et al. ..... 705/14
2004/0083149 A1 4/2004 Jones ..... 705/35
2004/0145726 A1 7/2004 Csulits et al. ..... 356/71
2004/0149538 A1 8/2004 Sakowski ..... 194/207
2004/0153406 A1 8/2004 Alarcon-Luther et al. ..... 705/41
2004/0153408 A1 8/2004 Jones et al. ..... 705/43
2004/0154964 A1 8/2004 Jones ..... 209/534
2004/0173432 A1 9/2004 Jones ..... 194/216
2004/0188221 A1 9/2004 Carter ..... 194/215
2004/0251110 A1 12/2004 Jenrick et al. ..... 194/207
2005/0029168 A1 2/2005 Jones et al. ..... 209/534
2005/0035034 A1 2/2005 Long et al. ..... 209/534
2005/0040225 A1 2/2005 Csulits et al. ..... 235/379
2005/0047642 A1 3/2005 Jones et al. ..... 382/137
2005/0060055 A1 3/2005 Hallowell et al. ..... 700/95
2005/0060059 A1 3/2005 Klein et al. ..... 700/213
2005/0060061 A1 3/2005 Jones ..... 700/226

| | | | | |
|---|---|---|---|---|
| 2005/0077142 | A1 | 4/2005 | Tam et al. | 194/217 |
| 2005/0086271 | A1 | 4/2005 | Jones et al. | 707/200 |
| 2005/0087422 | A1 | 4/2005 | Maier et al. | 194/207 |
| 2005/0108165 | A1 | 5/2005 | Jones et al. | 705/43 |
| 2005/0117791 | A2 | 6/2005 | Raterman et al. | 382/135 |
| 2005/0117792 | A2 | 6/2005 | Graves et al. | 382/135 |
| 2005/0150738 | A1 | 7/2005 | Hallowell et al. | 194/206 |
| 2005/0163361 | A1 | 7/2005 | Jones et al. | 382/135 |
| 2005/0163362 | A1 | 7/2005 | Jones et al. | 382/137 |
| 2005/0169511 | A1 | 8/2005 | Jones | 382/135 |
| 2005/0173221 | A1 | 8/2005 | Maier et al. | 194/207 |
| 2005/0183928 | A1 | 8/2005 | Jones et al. | 194/207 |
| 2005/0207634 | A1 | 9/2005 | Jones et al. | 382/135 |
| 2005/0213803 | A1 | 9/2005 | Mennie et al. | 382/135 |
| 2005/0241909 | A1 | 11/2005 | Mazur et al. | 194/207 |
| 2005/0249394 | A1 | 11/2005 | Jones et al. | 382/135 |
| 2005/0256792 | A1 | 11/2005 | Shimizu et al. | 705/35 |
| 2005/0265591 | A1 | 12/2005 | Jones et al. | 382/135 |
| 2005/0276458 | A1 | 12/2005 | Jones et al. | 382/135 |
| 2005/0278239 | A1 | 12/2005 | Jones et al. | 705/35 |
| 2006/0010071 | A1 | 1/2006 | Jones et al. | 705/42 |
| 2006/0054455 | A1 | 3/2006 | Kuykendall et al. | 194/217 |
| 2006/0054457 | A1 | 3/2006 | Long et al. | 194/347 |
| 2006/0064379 | A1 | 3/2006 | Doran et al. | 705/42 |
| 2006/0078186 | A1 | 4/2006 | Freeman et al. | 382/135 |
| 2006/0149415 | A1 | 7/2006 | Richards | 700/236 |
| 2006/0182330 | A1 | 8/2006 | Chiles | 382/135 |
| 2006/0195567 | A1 | 8/2006 | Mody et al. | 709/224 |
| 2006/0205481 | A1 | 9/2006 | Dominelli | 463/25 |
| 2006/0207856 | A1 | 9/2006 | Dean et al. | 193/302 |
| 2006/0210137 | A1 | 9/2006 | Raterman et al. | 382/135 |
| 2006/0274929 | A1 | 12/2006 | Jones et al. | 382/135 |
| 2006/0283685 | A1 | 12/2006 | Cousin | 194/217 |
| 2007/0071302 | A1 | 3/2007 | Jones et al. | 382/135 |
| 2007/0076939 | A1 | 4/2007 | Jones et al. | 382/135 |
| 2007/0078560 | A1 | 4/2007 | Jones et al. | 700/224 |
| 2007/0095630 | A1 | 5/2007 | Mennie et al. | 194/206 |
| 2007/0112674 | A1 | 5/2007 | Jones et al. | 705/45 |
| 2007/0122023 | A1 | 5/2007 | Jenrick et al. | 382/135 |
| 2007/0172107 | A1 | 7/2007 | Jones et al. | 382/137 |
| 2007/0221470 | A1 | 9/2007 | Mennie et al. | 194/216 |
| 2007/0237381 | A1 | 10/2007 | Mennie et al. | 382/135 |
| 2009/0096205 | A1* | 4/2009 | Brown et al. | 283/67 |

FOREIGN PATENT DOCUMENTS

| | | | |
|---|---|---|---|
| CA | 2143943 | C | 3/2003 |
| DE | 660 354 | | 5/1938 |
| DE | 30 21 327 | | 12/1981 |
| EP | 0 071 421 | | 2/1983 |
| EP | 0 077 464 | | 4/1983 |
| EP | 0 083 062 | | 7/1983 |
| EP | 0 101 115 | | 2/1984 |
| EP | 0 109 743 | | 5/1984 |
| EP | 0 185 200 | | 6/1986 |
| EP | 0 253 935 | | 1/1988 |
| EP | 0 325 364 | | 7/1989 |
| EP | 0 338 123 | | 10/1989 |
| EP | 0 342 647 | | 11/1989 |
| EP | 0 351 217 | | 1/1990 |
| EP | 0 402 627 | | 12/1990 |
| EP | 0 578 875 | | 1/1994 |
| EP | 0 583 526 | | 2/1994 |
| EP | 0 583 723 | | 2/1994 |
| EP | 0 612 042 | | 8/1994 |
| EP | 0 612 042 | A2 | 8/1994 |
| EP | 0 613 107 | | 8/1994 |
| EP | 0 633 552 | | 1/1995 |
| EP | 0 633 553 | | 2/1995 |
| EP | 0 671 696 | | 9/1995 |
| EP | 0 718 809 | | 6/1996 |
| EP | 0 718 809 | A2 | 6/1996 |
| EP | 0 667 973 | | 1/1997 |
| EP | 0 612 042 | B1 | 6/1998 |
| EP | 0 926 634 | | 6/1999 |
| EP | 0 548 142 | | 9/1999 |
| EP | 0 548 142 | B2 | 9/1999 |
| EP | 0 708 419 | | 1/2000 |
| EP | 0 708 419 | B1 | 1/2000 |
| EP | 0 824 736 | | 3/2000 |
| EP | 0 824 736 | B1 | 3/2000 |
| EP | 0 686 292 | | 7/2000 |
| EP | 0 686 292 | B1 | 7/2000 |
| EP | 0 760 987 | | 9/2000 |
| EP | 0 760 987 | B1 | 9/2000 |
| EP | 1 104 920 | A1 | 6/2001 |
| EP | 1 209 639 | | 5/2002 |
| EP | 1 528 513 | A1 | 5/2005 |
| FR | 2042254 | | 1/1971 |
| FR | 70 11438 | | 2/1971 |
| GB | 2 035 642 | | 6/1980 |
| GB | 2 038 063 | | 7/1980 |
| GB | 2 096 376 | | 10/1982 |
| GB | 2 175 427 | | 11/1986 |
| GB | 2 190 996 | | 12/1987 |
| GB | 2 198 274 | | 6/1988 |
| GB | 2 201 821 | A | 9/1988 |
| GB | 2 204 166 | | 11/1988 |
| GB | 2 223 872 | | 4/1990 |
| GB | 2 272 762 | | 5/1994 |
| GB | 2458387 | A | 9/2009 |
| GB | 2468783 | A | 9/2010 |
| JP | 49-58899 | | 6/1974 |
| JP | 50/158343 | | 12/1975 |
| JP | 52-014495 | | 2/1977 |
| JP | 52-71300 | | 6/1977 |
| JP | 56-40992 | | 4/1981 |
| JP | 57-117080 | | 7/1982 |
| JP | 59-79392 | | 5/1984 |
| JP | 60-16271 | | 2/1985 |
| JP | 62-134168 | | 8/1987 |
| JP | 62/134168 | | 8/1987 |
| JP | 62-182995 | | 8/1987 |
| JP | 62/182995 | | 8/1987 |
| JP | 62-220843 | | 9/1987 |
| JP | 62/221773 | | 9/1987 |
| JP | 62-166562 | | 10/1987 |
| JP | 64/035683 | | 2/1989 |
| JP | 64-042789 | | 2/1989 |
| JP | 64-067698 | | 3/1989 |
| JP | 01-118995 | | 5/1989 |
| JP | 64-035683 | | 6/1989 |
| JP | 1/307891 | | 12/1989 |
| JP | 2-12492 | | 1/1990 |
| JP | 02/252096 | | 10/1990 |
| JP | 03-012776 | | 1/1991 |
| JP | 02-050793 | | 2/1991 |
| JP | 3/63795 | | 3/1991 |
| JP | 3/92994 | | 4/1991 |
| JP | 03-156673 | | 7/1991 |
| JP | 04-085695 | | 3/1992 |
| JP | 41/75993 | | 6/1992 |
| JP | 05-046839 | A | 2/1993 |
| JP | 05-217048 | A | 8/1993 |
| JP | 05-274527 | | 10/1993 |
| JP | 06/035946 | | 2/1994 |
| JP | 61/03285 | | 4/1994 |
| JP | 06-035946 | | 10/1994 |
| JP | 09-251566 | A | 9/1997 |
| JP | 62-221773 | | 9/1997 |
| JP | 09251566 | | 9/1997 |
| JP | 2000-167231 | A | 6/2000 |
| JP | 2002/117439 | | 4/2002 |
| JP | 2003/242287 | | 8/2003 |
| JP | 2004-213188 | | 7/2004 |
| JP | 2004/213188 | | 7/2004 |
| SE | 44 244 | | 9/1988 |
| WO | WO 85/00909 | | 2/1985 |
| WO | WO 90/07165 | | 6/1990 |
| WO | WO 91/06927 | A1 | 5/1991 |
| WO | WO 91/08952 | A1 | 6/1991 |
| WO | WO 91/11778 | | 8/1991 |
| WO | WO 91/12594 | A1 | 8/1991 |
| WO | WO 91/18371 | A1 | 11/1991 |
| WO | WO 92/08212 | A1 | 5/1992 |
| WO | WO 92/14221 | | 8/1992 |
| WO | WO 92/17394 | | 10/1992 |
| WO | WO 92/20043 | A1 | 11/1992 |
| WO | WO 92/20044 | A1 | 11/1992 |

| | | | |
|---|---|---|---|
| WO | WO 92/22044 | A1 | 12/1992 |
| WO | WO 93/00660 | A1 | 1/1993 |
| WO | WO 93/09621 | | 5/1993 |
| WO | WO 93/23824 | | 11/1993 |
| WO | WO 94/06101 | | 3/1994 |
| WO | WO 94/08319 | A1 | 4/1994 |
| WO | WO 94/16412 | | 7/1994 |
| WO | WO 94/19773 | | 9/1994 |
| WO | WO 94/23397 | A1 | 10/1994 |
| WO | WO 95/02226 | A1 | 1/1995 |
| WO | WO 95/04978 | A1 | 2/1995 |
| WO | WO 95/06920 | A1 | 3/1995 |
| WO | WO 95/24691 | | 3/1995 |
| WO | WO 95/09406 | A1 | 4/1995 |
| WO | WO 95/13596 | A1 | 5/1995 |
| WO | WO 95/19017 | A1 | 7/1995 |
| WO | WO 95/19019 | | 7/1995 |
| WO | WO 95/23387 | A1 | 8/1995 |
| WO | WO 96/10800 | | 9/1995 |
| WO | WO 95/30215 | A1 | 11/1995 |
| WO | WO 96/07163 | A1 | 3/1996 |
| WO | WO 96/07990 | A1 | 3/1996 |
| WO | WO 96/12253 | A1 | 4/1996 |
| WO | WO 96/27525 | A1 | 9/1996 |
| WO | WO 96/27859 | A1 | 9/1996 |
| WO | WO 96/36933 | | 11/1996 |
| WO | WO 97/22919 | A1 | 6/1997 |
| WO | WO 97/25692 | A1 | 7/1997 |
| WO | WO 97/29459 | | 8/1997 |
| WO | WO 97/30422 | | 8/1997 |
| WO | WO 97/43734 | | 11/1997 |
| WO | WO 97/45810 | | 12/1997 |
| WO | WO 98/12662 | | 3/1998 |
| WO | WO 98/13785 | | 4/1998 |
| WO | WO 98/24041 | | 6/1998 |
| WO | WO 98/24052 | | 6/1998 |
| WO | WO 98/24067 | | 6/1998 |
| WO | WO 98/35323 | | 8/1998 |
| WO | WO 98/40839 | | 9/1998 |
| WO | WO 98/47000 | | 10/1998 |
| WO | WO 98/47100 | | 10/1998 |
| WO | WO 98/48383 | | 10/1998 |
| WO | WO 98/48384 | | 10/1998 |
| WO | WO 98/48385 | | 10/1998 |
| WO | WO 98/50892 | | 11/1998 |
| WO | WO 98/51082 | | 11/1998 |
| WO | WO 98/59323 | | 12/1998 |
| WO | WO 99/00776 | | 1/1999 |
| WO | WO 99/06937 | A1 | 2/1999 |
| WO | WO 99/09511 | | 2/1999 |
| WO | WO 99/14668 | | 3/1999 |
| WO | WO 99/16027 | A2 | 4/1999 |
| WO | WO 99/21141 | A1 * | 4/1999 |
| WO | WO 99/23601 | | 5/1999 |
| WO | WO 99/33030 | | 7/1999 |
| WO | WO 99/41695 | | 8/1999 |
| WO | WO 99/48040 | | 9/1999 |
| WO | WO 99/48042 | | 9/1999 |
| WO | WO 99/48057 | A1 | 9/1999 |
| WO | WO 99/48058 | A1 | 9/1999 |
| WO | WO 00/24572 | | 5/2000 |
| WO | WO 00/48911 | A1 | 8/2000 |
| WO | WO 00/65546 | A1 | 11/2000 |
| WO | WO 01/08108 | | 2/2001 |
| WO | WO 01/59685 | | 8/2001 |
| WO | WO 01/59723 | | 8/2001 |
| WO | WO 01/63565 | A2 | 8/2001 |
| WO | WO 02/29735 | | 4/2002 |
| WO | WO 02/32524 | A1 | 4/2002 |
| WO | WO 02/054360 | | 7/2002 |
| WO | WO 02/071343 | A1 | 9/2002 |
| WO | WO 03/005312 | | 1/2003 |
| WO | WO 03/028361 | | 4/2003 |
| WO | WO 03/029913 | | 4/2003 |
| WO | WO 03/030113 | | 4/2003 |
| WO | WO 03/052700 | A3 | 6/2003 |
| WO | WO 03/067532 | | 8/2003 |
| WO | WO 03/079300 | A1 | 9/2003 |
| WO | WO 03/085610 | A1 | 10/2003 |
| WO | WO 03/107280 | A2 | 12/2003 |
| WO | WO 03/107282 | | 12/2003 |
| WO | WO 2004/010367 | | 1/2004 |
| WO | WO 2004/025412 | A2 | 3/2004 |
| WO | WO 2004/027717 | | 4/2004 |
| WO | WO 2004/036508 | | 4/2004 |
| WO | WO 2004/038631 | | 5/2004 |
| WO | WO 2004/044853 | A1 | 5/2004 |
| WO | WO 2004/068422 | | 8/2004 |
| WO | WO 2004/109464 | A3 | 12/2004 |
| WO | WO 2005/013209 | A2 | 2/2005 |
| WO | WO 2005/017842 | A1 | 2/2005 |
| WO | WO 2005/028348 | A2 | 3/2005 |
| WO | WO 2005/029240 | A2 | 3/2005 |
| WO | WO 2005/036445 | A1 | 4/2005 |
| WO | WO 2005/041134 | A2 | 5/2005 |
| WO | WO 2005/076229 | A1 | 8/2005 |
| WO | WO 2005/088563 | A1 | 9/2005 |
| WO | WO 2006/039439 | A2 | 4/2006 |
| WO | WO 2006/076289 | A2 | 7/2006 |
| WO | WO 2006/076634 | A2 | 7/2006 |
| WO | WO 2006/086531 | A1 | 8/2006 |
| WO | WO 2007/035420 | A2 | 3/2007 |
| WO | WO 2007/120825 | A2 | 10/2007 |

OTHER PUBLICATIONS

Jun. 12, 2006 Amendment Responsive to the Final Office Action Mailed Mar. 10, 2006 (From prosecution history of U.S. Appl. No. 10/198,872).

Jun. 29, 2006 Amendment Responsive to the Final Office Action Mailed Mar. 10, 2006 (From prosecution history of U.S. Appl. No. 10/198,872).

Notice of Allowance Mailed Oct. 19, 2007 (From prosecution history of U.S. Appl. No. 10/393,867).

Notice of Allowance and Fee(s) Due Mailed Sep. 18, 2007 (From prosecution history of U.S. Appl. No. 10/393,867).

Amendment Responsive to Non-Final Office Action Mailed Apr. 20, 2007 (From prosecution history of U.S. Appl. No. 10/393,867).

Advisory Action (From prosecution history of U.S. Appl. No. 10/198,872).

AFB Currency Recognition System (1982).

Amendment and Response to Final Office Action Dated Jan. 25, 2007 Mailed Mar. 26, 2007 (From prosecution history of U.S. Appl. No. 10/393,867).

Amendment and Response to Office Action Mailed Sep. 15, 2006 (From prosecution history of U.S. Appl. No. 10/198,872).

Amendment Responsive to Non/Final Office Action Mailed Apr. 20, 2007 (From prosecution history of U.S. Appl. No. 10/393,867).

Amiel Industries, brochure for "AI/1500 'Pulsar,'" 13 pages (no date).

Ascom, brochure for "Cashflow Emerald," 2 pages (no date).

ATS Money Systems, Inc, brochure entitled "The Cash Room Is History," 4 pages (no date).

Barton, Louis L, "Check Processing Operations," Chapter 8 and Appendix 2, pp. 119/140 and 225/231 (1994).

Brandt, Inc, advertisement entitled "Solving Problems, Pleasing Customers, Building Deposits" for System 930 Electric Counter/Sorter, 1 page (no date).

Brandt, Inc, brochure for "95 Series Coin Sorter/Counter," 2 pages (no date).

Brandt, Inc, brochure for "Model 1205 Coin Sorter/Counter," 2 pages (no date).

Brandt, Inc, brochure for "Model 1400 Coin Sorter/Counter," 2 pages (no date).

Brandt, Inc, brochure for "Model 817 Automated Coin And Currency Ordering System," 2 pages (no date).

Brandt, Inc, brochure for "Model 920/925," 2 pages (no date).

Brandt, Inc, brochure for "Model 940/6 High Speed Sorter/Counter," 2 pages (no date).

Brandt, Inc, brochure for "Model 952 Coin Sorter/Counter," 2 pages (no date).

Brandt, Inc, brochure for "Model 954 Coin Sorter/Counter," 2 pages (no date).

Brandt, Inc, brochure for "Model 957 Coin Sorter/Counter," 2 pages (no date).
Brandt, Inc, brochure for "Model 958 Coin Sorter/Counter," 5 pages (1982).
Brandt, Inc, brochure for "Model 960 High/Speed Coin Sorter & Counter," 2 pages (no date).
Brandt, Inc, brochure for "Model 966 Microsort™ Coin Sorter And Counter," 4 pages, 1979.
Brandt, Inc, brochure for "Model 970 Coin Sorter & Counter," 2 pages (no date).
Brandt, Inc, brochure for "System 945," 2 pages (no date).
Brandt, Mach 7 High/Speed Coin Sorter/Counter, 2 pages (Apr. 1, 1993).
Brandt, Model 8904 Upfeed, High Speed 4/Denomination Currency Dispenser, 2 pages (date prior to May 1996).
Case/ICC Limited, brochure for "CDS Automated Receipt Giving Cash Deposit System," 3 pages (no date).
Cash Depositing System CDS 5700 and CDS 5800 (Jan. 3, 1995).
Cash Receipt System CRS/6501/CRS6510, IREIS (Feb. 1995).
Cash, Martin, "Bank Blends New Technology With Service," Winnipeg Free Press, 1 page (Sep. 4, 1992).
Cassius Elston, "No More Lines Self Serve Cash/Out," Drop Stream Developments, p1 (date prior to May 13, 1995).
Childers Corporation, brochure and letter for "Computerized Sorter/Counter," 3 pages (Nov. 1981).
Contomat (date prior to May 13, 1996).
CTCoin, brochure for "CDS602 Cash Deposit System," 1 page (no date).
Cummins Automated Money Processing Systems "No Wonder You Love It . . . It Was Designed For You!" / Advertising Sheet (undated), 1 page.
Cummins JetSort® Coin Sorter/Counter Model 1760—Product Information Manual (undated), 2 page.
Cummins JetSort® Communication Package for Models 1770 and 3000 Series JetSort (undated), 10 pages.
Cummins JetSort® High Speed Coin Sorter/Counter Model 1701—Product Information Manual (1987) 6 pages.
Cummins JetSort® Model 1701 With Jetstops Coinsorter Operating Instructions Manual (© 1984), 17 pages.
Cummins JetSort® Operating Instructions for JetSort® Model CA/700/01 Coin Sorter/Counter (© 1982), 14 pages.
Cummins Operating Instructions for JetSort Model 1765 (Apr. 14, 1989), 32 pages.
Cummins/Allison Corp—"Talking JetSort 3000—Listen to what JetSort has to say!" (date unknown), 1 page.
Cummins/Allison Corp—"Money Processing Made Easy The cost/effective counting pair for increased . . . Speed, Accuracy and Ease/of/Operation in all coin and currency processing installations" (1st print Jun. 1983), 2 pages.
Cummins/Allison Corp—"The Universal Solution to All Coin and Currency Processing Needs" (final print Mar. 1983), 1 page.
Cummins/Allison Corp—"Time for A Change—Be A Smashing Success!" (dated Jun. 1988), 1 page.
Cummins/Allison Corp—"Time for A Change—JetSort® vs Brandt X" (dated Jun. 1988), 1 page.
Cummins/Allison Corp—"Time for A Change—No Coins Sorted After 3:00 or on Saturday" (dated Jun. 1988), 1 page.
Cummins/Allison Corp—"What do all these Banks have in Common . . . ? They all rely on Cummins Quality Products" (1st print Aug. 1982), 3 pages.
Cummins/Allison Corp / AMS Cummins Automated Money Systems—Case Study "Cummins Money Processing System Boosts Teller Service at University State Bank", (1st print Nov. 1981), 1 pages.
Cummins/Allison Corp / AMS Cummins Automated Money Systems—Case Study "6,000 Coin Per Minute Counter/Sorter Keeps Pace With Fifth/Third Bank's Money Processing Needs", (1st print Mar. 1982), 1 pages.
Cummins/Allison Corp—AMS Cummins Automated Money Systems—Case Study "JetSort® Gives Bank Coin Service Edge", (1st print Apr. 1982), 1 pages.
Cummins/Allison Corp—AMS Cummins Automated Money Systems—Case Study "High Speed Coin Processing Power at Covenco Vending" (1st print Jul. 1983), 1 pages.
Cummins/Allison Corp—Enhanced Electronics For the JetSort® 3200 (dated Apr. 1989), 1 page.
Cummins/Allison Corp—General Services Administration—Office of Federal Supply Services—Authorized Federal Supply Schedule Price List—Catalog (1st print Jun. 1986—obsolete Jul. 1987), 32 pages.
Cummins/Allison Corp—High Speed Coin Sorter & Counter for Payphone Applications (dated Mar. 1990), 2 pages.
Cummins/Allison Corp—Product Information for JetSort® 3000, "Breakthrough Technology 3,000 Coin per Minute" 9995% Accurate (dated Mar. 1988), 2 pages.
Cummins/Allison Corp—Product Information for JetSort® 3000, 3,000 Coin per Minute Sorter/Counter "Special Preview" (dated Nov. 1987), 1 page.
Cummins/Allison Corp—Product Information for JetSort® Coin Sorter/Counter Model 1760 (dated Jul. 1985), 2 page.
Cummins/Allison Corp—Product Information for JetSort® Coin Sorter/Counter Model 1765 (dated Apr. 1989), 1 page.
Cummins/Allison Corp—Product Information for JetSort® High Speed Coin Sorter/Counter—the JetSort Model 1770 (dated Oct. 1986), 1 page.
Cummins/Allison Corp—Product Information Sheet for JetSort® High Speed Coin Sorters 3000 Series (undated) 2 page.
Cummins/Allison Corp "Count on Cummins"—Product Information JetSort—With Adjustable Bag Stops! Perfect for Dollar Bill Validators (dated Apr. 1987), 3 pages.
Cummins/Allison Corp JetSort® Parts & Service Manual for Model CA/1701 (© 1987).
Cummins/Allison Corp—JetSort® Series V, High Speed Coin Sorter/Counter (dated Sep. 1990), 2 pages.
Cummins/Allison Corp Operating Instruction for JetSort (© 1980), 54 pages.
Cummins/Allison Corp Operator's Manual for JetSort® High Speed Coin Sorter/Counter 3000 Series (undated), 60 pages.
Cummins/Allison Corp Product Information Sheet for Model 1701 (1st print Jul. 1985), 2 pages.
Cummins/Allison Corp Product Information Sheet for Model CA/701 (1st print Jul. 1983), 2 pages.
Cummins/Allison Corp, brochure entitled "Cash Information & Settlement Systems," 4 pages (no date).
Cummins/Allison Corp, brochure entitled "State/Of/The/Art Coin Processing Comes Of Age," 2 pages (no date).
Cummins/Allison Corp, brochure for "CA/750 JetSort Coin Processor," 1 page (no date).
Cummins/Allison Corp, brochure for "High Speed Coin Sorter/Counter 2000 Series," 2 pages (no date).
Cummins/Allison Corp, Operating Instructions for JetScan Currency Scanner/Counter, Model 4061 (Apr. 20, 1993).
Cummins/Allison Corp, Operating Instructions for JetScan Currency Scanner/Counter, Model 4062 (Nov. 28, 1994).
Cummins/Allison Corp, Operating Instructions for JetSort® High Speed Sorter/Counter (Kits I & J), 11 pages (1993).
Cummins/Allison Corp, Operator's Manual for JetScan Currency Scanner/Counter, Model 4060 (Aug. 1991).
Cummins/Allison Corp, Sale of JetScan Currency Scanner/Counter, Model 4060 (Aug. 1991).
Cummins/Allison Corp, Sale of JetScan Currency Scanner/Counter, Model 4061 (Apr. 20, 1993).
Cummins/Allison Corp, Sale of JetScan Currency Scanner/Counter, Model 4062 (Nov. 28, 1994).
Currency Systems PCT, CPS 600 and CPS 900 (estimated 1994).
Currency Systems PCT, Medium Speed Currency Sorting Family, CPS 600 and CPS 900, 4 pages (1994).
Currency Systems PCT, Mr W Kranister in Conversation With Richard Haycock, pp. 1/5 (estimated 1994).
Currency Systems PCT/Currency Processing Systems, CPS 300, 4 pages (1992).
De La Rue Garny GmbH, brochure and translation for "Cash Depositing Systems CDS 5700 and CDS 5800," 7 pages (no date).

De La Rue Garny GmbH, brochure for "Cash Deponier System CDS 500," 6 pages (no date).
Declaration of Douglas Mennie (From prosecution history of U.S. Appl. No. 10/198,872).
Diebold, article entitled "Merchant MicroBranch Combines ATM, After/Hour Depository, Rolled/Coin Dispenser," 1 page (Nov. 1997).
Examiner Interview Summary (From prosecution history of U.S. Appl. No. 10/198,872).
FaGBS/Geldbearbeitungssysteme, "Technical Specifications GBS9401 SB," 24 pages (no date).
Final Office Action Mailed Jan. 25, 2007 (From prosecution history of U.S. Appl. No. 10/393,867).
Final Office Action Mailed Jun. 5, 2007 (From prosecution history of U.S. Appl. No. 10/198,872).
Frisco Bay, brochure for "Commercial Kiosk," 4 pages (no date).
Glory (USA) Inc, brochure for "AMT Automated Merchant Teller," 4 pages (no date).
Glory (USA) Inc, brochure for "SR/700 Cash Settlement System," 4 pages (no date).
Glory, GFB/200/210/220/230, Desk/Top Bank Note Counter, 2 pages (estimated date prior to Aug. 9, 1994).
Glory, The New CRS/8000 Cash Redemption System (date prior to May 13, 1996).
Glory, UF/1D, 2 pages (estimated date prior to Aug. 9, 1994).
Hamilton, brochure for "Hamilton's Express Banking Center," 4 pages (no date).
ISH Electronic, brochure and translation for "ISH 12005/501 Self/Service Unit," 4 pages (no date).
ISH 12005/500 SB/Münzähler (date prior to May 13, 1996, with translation).
Mosler, Inc, "The Mosler/Toshiba CF/420" (1989).
NamSys Inc, brochure for "NamSys Express™," 2 pages (no date).
NGZ 2100 (date prior to May 13, 1996).
PREMA 405(RE) Self Service Coin Deposit Facility (date prior to May 13, 1996).
Reis Eurosystems, brochure for "CS 3510/Disc/Sorter," 1 page (no date).
Reis Eurosystems, brochure for "The New Standard/Class Coin Deposit Systems," 1 page (no date).
Response to Final Office Action Mailed Jun. 5, 2007 (From prosecution history of U.S. Appl. No. 10/198,872).
Response to Office Action Dated Sep. 20, 2006 Mailed Dec. 20, 2006 (From prosecution history of U.S. Appl. No. 10/393,867).
Response to Office Action Mailed Dec. 16, 2004 (From prosecution history of U.S. Appl. No. 10/198,872).
Response to the Office Action Mailed Jul. 29, 2004 (From prosecution history of U.S. Appl. No. 10/198,872).
Response to the Office Action Mailed Oct. 20, 2005 (From prosecution history of U.S. Appl. No. 10/198,872).
Royal Bank, article by Carolyn Leitch entitled "High/Tech Bank Counts Coins," 2 page (Sep. 18, 1991).
Royal Bank, article by Jade Hemeon entitled "Royal's Burlington Drive/In Bank Provides Customers 24/Hour Tellers," The Toronto Star, 1 page (Aug. 21, 1991).
Royal Bank, article by Murray Oxby entitled "Royal Bank Opens 'Super Branch,'" The Gazette Montreal, 1 page (Sep. 14, 1991).
Royal Bank, brochure for "SuperBranch," 2 pages (Feb. 1992).
Scan Coin AB, "PCT Report," 49 pages (Apr. 1987).
Scan Coin AB, brochure for "CDS Cash Deposit System," 6 pages (no date).
Scan Coin AB, brochure for "Money Processing Systems," 8 pages (no date).
Scan Coin AB, brochure for "Scan Coin World," 2 pages (Feb. 1988).
Scan Coin AB, Technical Manual for "Cash Deposit System Model CDS 600 & CDS 640," 45 pages (no date).
Scan Coin AB, Technical Manual for "CDS MK1 Coin Deposit System," 32 pages (1991).
Scan Coin AB, Technical Manual for "SC 102 Value Counter," 28 pages (no date).
Scan Coin AB, Technical Referens Manual for "CDS Coin Deposit System," 47 pages (1989).
Scan Coin AB, User's Manual for "CDS 600," 23 pages (no date).
Scan Coin CDS 640 Cash Deposit System (Jun. 15, 1994).
Siemens Nixdorf Informationssysteme AG, brochure for "ProCash CRS," 4 pages (1997).
Toshiba Corporation, brochure for "CF/400 Series," 6 pages (no date).
Toshiba/Mosler, Operator's Manual for CF/420 Cash Settlement System, pp. 1/C/3 (1989).
Toshiba/Mosler, revised drawings of portions of CF/420 Cash Management System (FIGS A/C) and description of same (1989).
Amendment Request Reconsideration After Non/Final Rejection, Aug. 6, 2009, U.S. Appl. No. 12/025,613.
Amendment Request Reconsideration After Non Final Rejection, Jan. 28, 2010, U.S. Appl. No. 12/025,613.
Examiner Search Results, Oct. 29, 2009, U.S. Appl. No. 12/025,613.
Examiner Search Results, May 1, 2009, U.S. Appl. No. 12/025,613.
Final Rejection, Mar. 11, 2010, U.S. Appl. No. 12/025,613.
Non/Final Rejection, May 1, 2009, U.S. Appl. No. 12/025,613.
Non/Final Rejection, Oct. 29, 2009, U.S. Appl. No. 12/025,613.
Appeal Brief Filed, Nov. 5, 2009, U.S. Appl. No. 11/803,281.
Affidavit/Dec Exhibit After Notice of Appeal, Nov. 5, 2009, U.S. Appl. No. 11/803,281.
Advisory Action, Aug. 12, 2009, U.S. Appl. No. 11/803,281.
Application Arguments Remarks Made In Amendment , Jul. 24, 2009, U.S. Appl. No. 11/803,281.
Examiners Results, Apr. 23, 2009, U.S. Appl. No. 11/803,281.
Applicant Argument Remarks Made In Amendment, Feb. 12, 2009, U.S. Appl. No. 11/803,281.
Non/Final Rejection, Oct. 17, 2008, U.S. Appl. No. 11/803,281.
Examiners Results, Oct. 17, 2008, U.S. Appl. No. 11/803,281.
Examiners Results, Jun. 17, 2008, U.S. Appl. No. 11/803,281.
Amendment Reconsideration After/Non Final Rejection, Jan. 27, 2010, U.S. Appl. No. 11/803,381.
Non/Final Rejection, Aug. 12, 2009, U.S. Appl. No. 11/803,381.
Amendment Submitted Entered With Filing of CPA/RCE, Jun. 30, 2009, U.S. Appl. No. 11/803,381.
Final Rejection, Mar. 30, 2009, U.S. Appl. No. 11/803,381.
Amendment Reconsideration After Non/Final Rejection, Jan. 23, 2009, U.S. Appl. No. 11/803,381.
Non/Final Rejection, Sep. 24, 2008, U.S. Appl. No. 11/803,381.
Applicant Response To Pre/Exam Formalities/Notice, Aug. 17, 2007, U.S. Appl. No. 11/803,381.
Notice of Appeal Filed, Feb. 8, 2010, U.S. Appl. No. 11/803,365.
Final Rejection, Nov. 9, 2009, U.S. Appl. No. 11/803,365.
Amendment Reconsideration Authorization for Extension, Jul. 14, 2009, U.S. Appl. No. 11/803,365.
Non/Final Rejection, Apr. 14, 2009, U.S. Appl. No. 11/803,365.
Amendment Reconsideration After Non/Final, Jan. 21, 2009, U.S. Appl. No. 11/803,365.
Non/Final Rejection, Oct. 20, 2008, U.S. Appl. No. 11/803,365.
Applicant Response to Pre/Exam Formalities, Aug. 17, 2007, U.S. Appl. No. 11/803,365.
Examiners Answer To Appeal Brief, Mar. 2, 2010, U.S. Appl. No. 11/803,366.
Appeal Brief Filed, Nov. 16, 2009, U.S. Appl. No. 11/803,366.
Appeal Brief Filed Oct. 8, 2009, U.S. Appl. No. 11/803,366.
Affidavit/Dec Exhibit After Notice of Appeal, Oct. 8, 2009 U.S. Appl. No. 11/803,366.
Notice of Appeal Filed Extension of Time, Aug. 11, 2009, U.S. Appl. No. 11/803,366.
Advisory Action Aug. 10, 2009, U.S. Appl. No. 11/803,366.
Amendment After Final Jul. 20, 2009, U.S. Appl. No. 11/803,366.
Final Rejection Apr. 20, 2009, U.S. Appl. No. 11/803,366.
Amendment Reconsideration After Non/Final Rejection Jan. 23, 2009, U.S. Appl. No. 11/803,366.
Non/Final Rejection Sep. 23, 2008, U.S. Appl. No. 11/803,366.
Preliminary Amendment May 14, 2007, U.S. Appl. No. 11/803,366.
Non Final Rejection Dec. 8, 2009, U.S. Appl. No. 11/726,828.
Amendment Reconsideration After Non/Final Sep. 2, 2009, U.S. Appl. No. 11/726,828.
Application Response To Pre Exam Formalities, Jun. 29, 2007, U.S. Appl. No. 11/726,828.
Pre/Exam Formalities Notice May 1, 2007, U.S. Appl. No. 11/726,828.

Office Action dated Jul. 31, 2007 (From prosecution history of U.S. Appl. No. 10/084,856).
Office Action dated Mar. 10, 2006 (From prosecution history of U.S. Appl. No. 10/198,872).
Office Action Mailed Apr. 20, 2007 (From prosecution history of U.S. Appl. No. 10/393,867).
Office Action Mailed Dec. 16, 2004 (From prosecution history of U.S. Appl. No. 10/198,872).
Office Action Mailed Jul. 29, 2004 (From prosecution history of U.S. Appl. No. 10/198,872).
Office Action Mailed Oct. 20, 2005 (From prosecution history of U.S. Appl. No. 10/198,872).
Office Action Mailed Sep. 15, 2006 (From prosecution history of U.S. Appl. No. 10/198,872).
Office Action Mailed Sep. 20, 2006 (From prosecution history of U.S. Appl. No. 10/393,867).
Preliminary Amendment Mailed Oct. 16, 2007 (From prosecution history of U.S. Appl. No. 10/393,867).
Notice of Allowance (U.S. Appl. No. 11/434,092).
Response to Final Office Action (U.S. Appl. No. 11/434,092).
Final Office Action (U.S. Appl. No. 11/434,092).
Response to Non/Final Office Action (U.S. Appl. No. 11/434,092).
Non/Final Office Action (U.S. Appl. No. 11/434,092).
Response to Non/Final Office Action Mailed Aug. 21, 2008 (U.S. Appl. No. 11/434,092).
Non/Final Office Action Mailed Aug. 21, 2008 (U.S. Appl. No. 11/434,092).
Final Office Action Mailed Mar. 11, 2010 (U.S. Appl. No. 12/025,613).
UK Search Report claims 1/12, 25/31 and 46/59.
UK Search Report claims 13/16.
UK Search Report claims 39/45 and 65/84.
UK Search Report claims 19/24, 32/38 and 60/64.
UK Search Report claims 16A/18.
Complaint, Cummins—*Allison Corp.* v. *Glory Ltd., Glory Shoji Co. Ltd., and Glory* (U.S.A. Inc., Civil Action No. 02C-7008, United States District Court, Northern District of Illinois, Eastern Division.
Billcon Corporation, Brochure for CCS-60/CCS-80 Series Coin Counter-Sorter, 2 pages (Oct. 1999).
Billcon Corporation, Photos for CCS-60/80, 1 page (Japanese language)(Oct. 12, 2000).
De La Rue Cash Systems, Inc., Brochure for ACD Automatic Coin Dispenser, 2 pages (no date).
De La Rue Cash Systems, Brochure for MACH 12 Coin Sorter/Counter, 2 pages (1999).
De La Rue Cash Systems, Brochure for MACH 12HD Coin Sorter/Counter, 2 pages (no date).
Glory, Brochure for GSA-500 Sortmaster, 2 pages (no date).
Magner, Brochure for Coinstream™ CPS 502 Self-Service Coin Processing System, 2 pages (no date).
Magner, Brochure for MAG II 100 Series Coin Sorters, 2 pages (no date).
Magner, Brochure for MAG II Model 915 Coin Counter/Packager, 2 pages (no date).
Magner, Brochure for Pelican 305 Coin Sorter, 2 pages (no date).
Magner, Brochure for 900 Series Coin Counters and Packagers, 2 pages (no date).

* cited by examiner

COIN REDEMPTION SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

The present invention claims priority to U.S. Provisional Patent Application Ser. Nos. 60/347,476 and 60/364,628, each of which is incorporated herein by reference in its entirety. U.S. Provisional Patent Application Ser. No. 60/347,476, titled "Coin Redemption System," was filed on Jan. 10, 2002. U.S. Provisional Patent Application Ser. No. 60/364,628, titled "Coin Redemption System," was filed on Mar. 15, 2002.

FIELD OF THE INVENTION

The present invention relates generally to currency processing machines, and, in particular, to a coin redemption system that processes coins of mixed denominations and outputs a receipt indicative of the value of the processed coins that is redeemable for currency bills.

BACKGROUND OF THE INVENTION

Coin processing machines generally have the ability to receive bulk coins from a user of the machine. Coin processing machines include a redemption type of machine wherein, after the deposited coins are counted, a receipt is issued indicating the value of the deposited coins. The user may redeem this receipt for the amount of deposited coins in the form of currency bills. In other embodiments, the receipt is redeemed for the amount of the deposited coins less a commission charged for use of the coin redemption machine.

Prior art coin redemption machines are commonly used in a banking environment and/or a retail environment such as a grocery store. In operation, a user inputs (i.e., deposits) a batch of coins of mixed denominations into a hopper of the coin redemption machine. The machine determines the value of the deposited coins and outputs a receipt indicative of the determined amount. In some embodiments, the receipt also indicates a second, lesser amount, which reflects a commission charged for use of the machine. The user redeems the receipt for paper currency for the value of the deposited coins less the commission. For example, in a banking environment, a user redeems the receipt at the teller's window. In a retail environment, the user can redeem the receipt at a cashier's station or a customer-service station.

One disadvantage associated with prior art coin redemption machines is the potential for fraud which exists with current receipt-type systems. For example, a receipt can be duplicated (i.e., counterfeited) and then redeemed more than once resulting in a loss for that particular store. Furthermore, if the receipt is lost by the user or is stolen from the user, the prior art machines fail to provide any manner for the user to recover their funds. Someone who has stolen or found the receipt can simply redeem the receipt from the retailer's cashier and receive the cash payment.

Accordingly, there exists a need for a coin redemption system that provides security measures to guard against the unauthorized reproduction of redeemable receipts issued by the coin redemption machine. Further, there exists a need for a coin redemption system that provides security measures to guard against the unauthorized redemption of otherwise valid receipts.

SUMMARY OF THE INVENTION

According to one embodiment of the present invention, a coin redemption system, in which a user deposits a batch of mixed coins of a plurality of denominations, comprises a coin input area for receiving a batch of mixed coins from a user of the coin redemption system, a coin processing unit coupled to the coin input area for determining the aggregate value of the coins received from the user, a controller for assigning a transaction number corresponding to the batch of received coins, a first printer for printing a receipt indicative of the determined value and the assigned transaction number, an output device disposed in a redemption area for displaying the assigned transaction number and the determined value.

The above summary of the present invention is not intended to represent each embodiment, or every aspect, of the present invention. Additional features and benefits of the present invention will become apparent from the detailed description, figures, and claims set forth below.

Figure 1:
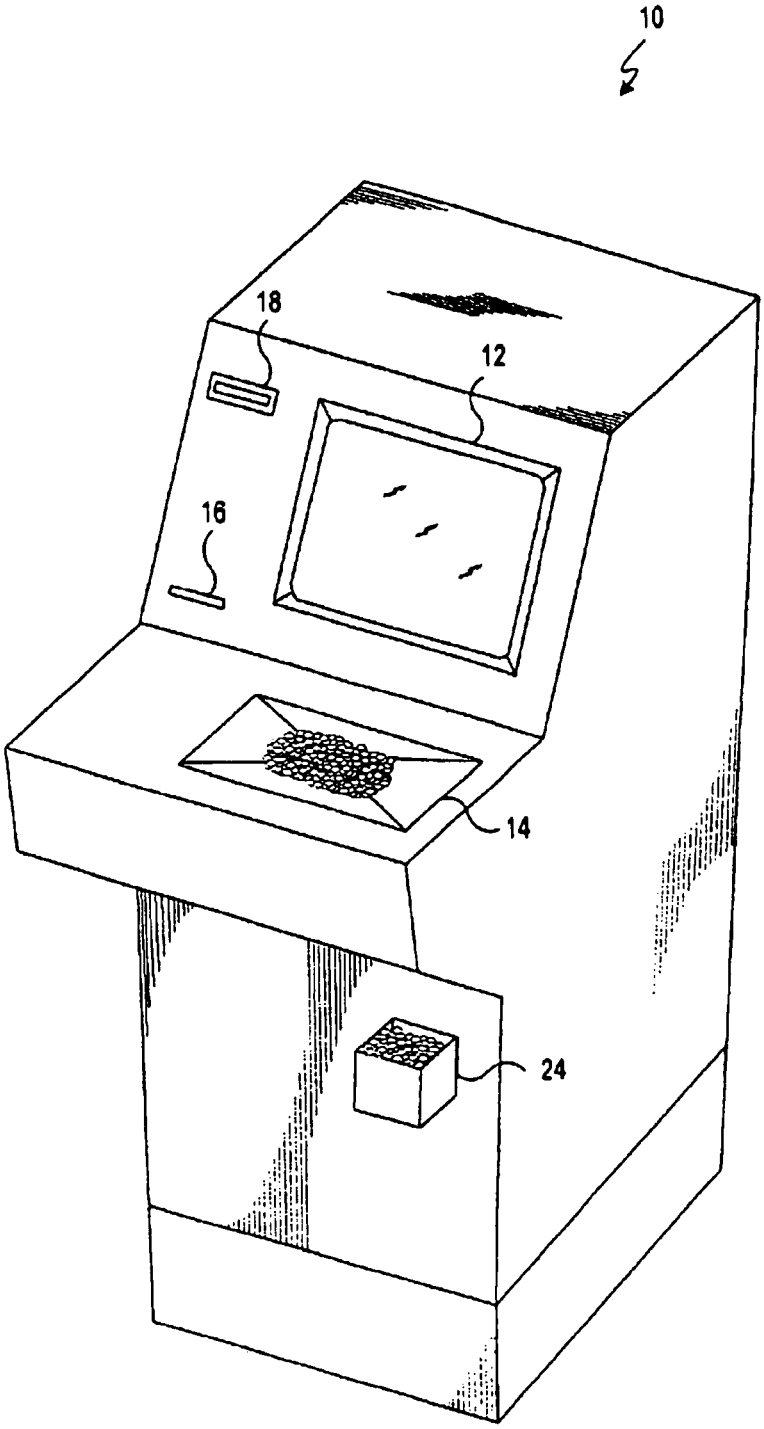
FIG. 1 is a perspective view of a coin redemption machine according to one embodiment of the present invention.

While the invention is susceptible to various modifications and alternative forms, specific embodiments are shown by way of example in the drawings and are described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Referring to the drawings and, initially, to FIG. 1, a coin redemption machine 10 according to one embodiment of the present invention includes a touch screen 12 to provide inputs from a machine user and also to display outputs to be viewed by the user. While the touch screen 12 is the preferred mode to enter data from the user of the coin redemption machine 10, the coin redemption machine 10 may also include a mechanical keyboard or buttons to receive such inputs.

The coin redemption machine 10 includes a coin input area 14 which receives coins of mixed denominations from a user. The coin input area 14 allows the user of the currency processing machine 10 to deposit the user's coins which will ultimately be converted to some other sort of fund source (i.e., currency bills, credit to a smartcard, credit to an account, credit for purchases in the store containing the redemption machine 10, etc.) that is available to the user.

According to the embodiment of the coin redemption machine 10 illustrated in FIG. 1, the coin input area 14 is generally funnel-shaped to direct coins to a coin processing area within the machine 10. According to an alternative embodiment of the coin redemption machine 10, the coin input area 14 includes a coin tray that is pivotable from a first position, wherein the coin tray is substantially horizontal, to a second position, wherein the coin tray is lifted causing the coins to slide under the force of gravity into the coin redemption machine 10. A coin tray similar to that described which may be used in connection with the coin input area 14 of the coin redemption machine 10 is described in greater detail in U.S. Pat. No. 4,964,495 entitled "Pivoting Tray For A Coin Sorter," which issued on Oct. 23, 1990 and is incorporated herein by reference in its entirety.

The currency processing machine 10 further includes a paper dispensing slot 16 for providing a user with a receipt of the transaction that the user has performed. The receipt issued by the coin redemption machine 10 is described in greater detail below according to several alternative embodiments of the present invention.

In its simplest form, the coin redemption machine 10 receives coins via the coin input receptacle 14, and after these deposited coins have been authenticated and counted, the currency redemption machine 10 outputs a receipt to the user indicative of the dollar amount of the deposited coins. For example, the user of the currency processing machine 10 may input $20.50 in various coins and the coin redemption machine 10 prints a receipt indicating that $20.50 worth of coins have been processed. The user can redeem the receipt for funds from an attendant of the coin redemption machine 10. An attendant may include a store employee such as a cashier at a grocery store or a teller at a bank. Alternatively, the user can redeem the receipt for credit towards purchases at the store where the machine is located and/or in exchange for merchandise at the store. Alternatively still, the currency processing machine 10 credits a user's account such as a bank account or an account associated with a store credit card, a store "rewards" program card or a coupon-type card which a user produces at the time of purchase for discounts. Further, in other embodiments, a commission may be charged for use of the machine. Alternatively still, a bonus may be added onto the amount redeemed. For example, a store may desire to have a promotion to attract users into a store whereby an amount (e.g., a percentage of the coins processed) in addition to the dollar amount of coins processed which is credited towards purchases at the store. Additionally, in other alternative embodiments of the coin redemption machine 10, the receipt includes other information such as a transaction number and/or totals for each coin denomination.

The coin redemption machine 10 also includes a media slot 18 into which the user may insert an account card (e.g., a bank card such as an ATM card, an identification card including the type distributed by grocery stores, smartcards, etc.). The media slot is coupled to a media reader/writer device 34 (FIG. 2) in the coin redemption machine 10 that is capable of reading from or writing to one or more types of media including ATM cards, credit cards, smartcards or other types of media cards. This media may include various types of memory storage technology such as magnetic storage, solid state memory devices and optical devices. The touch screen 12 typically provides the user with a menu of options which prompts the user to carry out a series of actions for identifying the user by displaying certain commands and requesting that the user depress touch keys on the touch screen 12 (e.g., a user PIN, account number, etc.).

Figure 2:
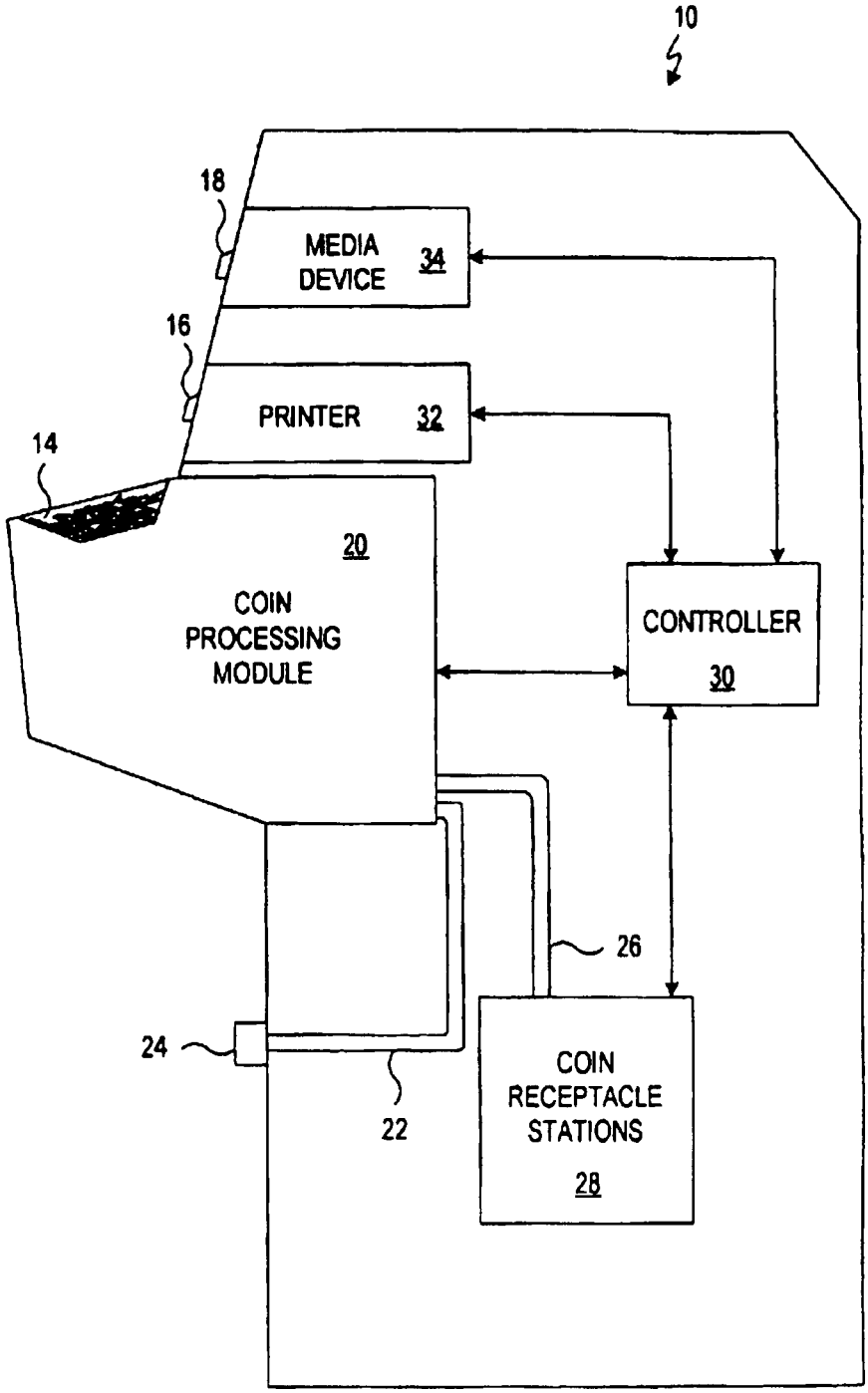
FIG. 2 is a side view of the coin redemption machine shown in FIG. 1 which schematically illustrates the components present in the coin redemption machine according to one embodiment of the present invention.

FIG. 2 illustrates a side view of the coin redemption machine 10. The coin redemption machine 10 includes a coin processing module 20. The coin processing module 20 counts and authenticates coins of mixed denominations that are deposited in the coin input receptacle 14, which leads directly into the coin processing module 20. The coins may also be sorted in the coin processing module 20 in a variety of ways such as by sorting based on the diameter of the coins. When a coin can not be authenticated by the coin processing module 20, that coin is directed through a coin reject tube 22 which leads to the rejected coin receptacle 24 which allows the user who has deposited such a non-authenticated coin to retrieve the coin by accessing the dispensed coin receptacle 24. Alternatively, non-authenticated coins may be routed to a reject coin bin (not shown) disposed within the coin redemption machine 10 and are not returned to the user. Disk-type coin sorters and authenticating devices which can perform the function of the coin processing module 20 of the coin redemption machine 10 are disclosed in U.S. Pat. Nos. 5,299,977, 5,453,047, 5,507,379, 5,542,880, 5,865,673 and 5,997,395, each of which is incorporated herein by reference in its entirety. Alternatively, other coin sorters such as rail sorters can be used to perform the function of the coin processing module 20. A rail sorter that can perform the function of the coin processing module 20 of the coin redemption machine 10 according to an alternative embodiment of the present invention is described in U.S. Pat. No. 5,382,191 entitled "Coin Queuing Device And Power Rail Sorter," which is incorporated herein by reference in its entirety.

The coin processing module 20 outputs the authenticated coins via one or more exit channels (not shown). According to one embodiment, each coin exit channel is coupled to a coin tube 26 which is coupled to a coin receptacle station 28. The coin tube 26 leads to coin receptacle station 28 for each of the coin denominations that are to be sorted and authenticated by the coin processing module 20. The coin receptacle station 28 includes coin bags or bins for holding each sorted coin denomination. Other coin distribution schemes are implemented in alternative embodiments of the present invention. Many alternative coin distribution schemes are described in greater detail in U.S. Pat. No. 6,318,537 B1 entitled "Currency Processing Machine With Multiple Internal Coin Receptacles," which is incorporated herein by reference in its entirety.

The currency processing machine 10 includes a controller 30 which is coupled to the coin processing module 20, a printer 32 for outputting a receipt via the paper dispensing slot 16, and a media reader/writer device 34 for receiving media via the media slot 18 within the currency processing machine 10 and controls the interaction among these units. For example, the controller 30 may review the input totals from the coin processing module 20 and direct the printer 32 to output a receipt indicative of the total amount or direct the media reader/writer device 34 to credit a smartcard for the values of the processed coins.

In an alternative embodiment of the coin redemption machine 10, the coin processing module 20 only counts the coins and does not store the coins in a sorted fashion. Or, the coin processing module 20 may tabulate the value of the coins that are processed without ever sorting them. In either of these situations, the coins are sent from the coin processing module 20 to a single coin receptacle station 28 that commingles the processing coins. Because the coins are not being sorted by denomination in this embodiment, the coin redemption machine 10 only requires one receptacle station 28 for collecting all of the mixed coins.

Figure 3:
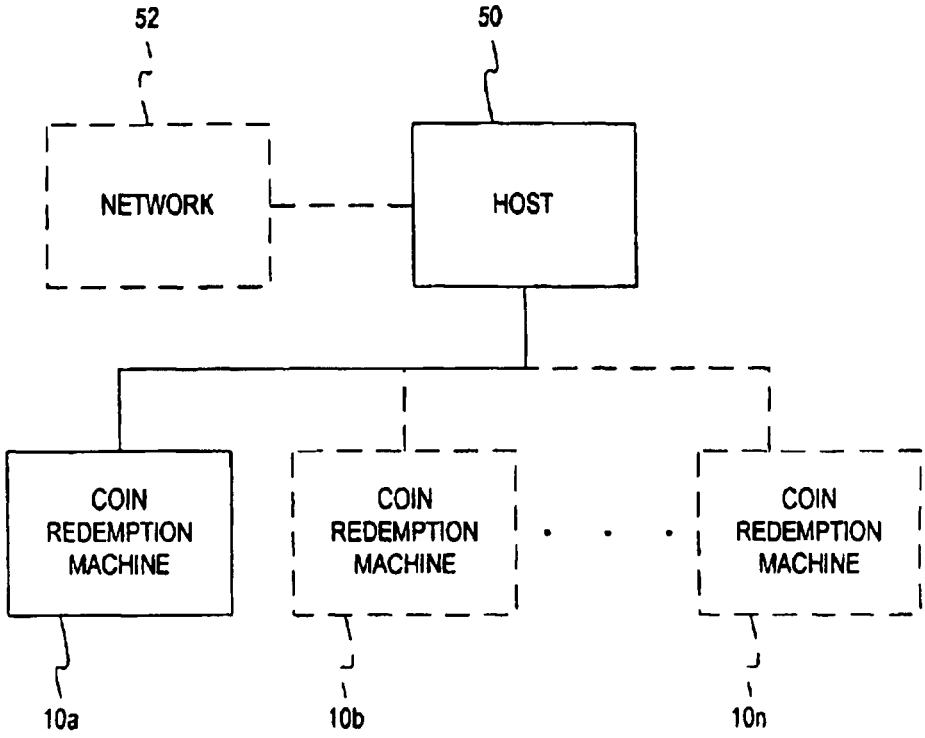
FIG. 3 schematically illustrates a plurality of coin redemption machines in communication with a network according to an alternative embodiment of the present invention.

Referring now to FIG. 3, a host system 50 is coupled to one or more coin redemption machines 10a, 10b, . . . 10n. The host system 50 communicates with each coin redemption machine 10 for tracking the various deposits input to the coin redemption machines 10 and the receipts printed, as will be described in greater detail below. Additionally, the coin redemption machines 10 send signals to the host system 50 when the coin receptacles of the coin receptacles station 28 are full or when a fault condition—a coin jam, coin bag is full, printer out of paper—is encountered. Moreover, the host system 50 may be connected to a network 52, such as an accounting system, which allows the user of the coin redemption machine 10 to credit the user's account after making a deposit. Alternatively, the coin redemption machine 10 outputs a receipt bearing an assigned transaction number and the host system 50 stores the transaction number and the corresponding amount. In a retail store setting where each cashier's station is coupled to the network 52, the cashier can verify the value of coins processed when presented with the receipt bearing the transaction number.

According to one alternative embodiment of the present invention, the receipt issued by the coin redemption machine 10 prints the store name (e.g., where the machine resides), the total amount of coins processed, and commission information charged by the store such as the percentage of commission being charged. For example, if a retail store charges a commission of 10%, the receipt may read "Subject to a Processing Fee of 10%—Remit to Any Cashier for Processing—Redeemable For Cash Only." When the cashier is presented with the receipt by the user, the cashier calculates the commission and then dispenses currency bills and coins to the user in an amount equal to the dollar value of the coins processes less the commission calculated by the cashier. According to some alternative embodiments, the cashier also provides the user with a second receipt, along with the funds, indicating the dollar amount of the processed coins, the dollar amount of the commission calculated by the cashier and the dollar amount of funds dispensed to the user. In a different system, the receipt may read "Redeemable For Cash Or Merchandise." Other information can also be printed on the receipt including a transaction number, date, time, other location identifying information, coin totals and amounts by denomination, and other messages. Other messages may include information directing a user to a redemption area such as "Only Redeemable at Service Desk" or "Redeemable at Cashier Stations Nos. 10-15."

According to another alternative embodiment, the coin redemption machine 10 includes a currency bill dispensing module for dispensing currency bills in the amount of the deposited coins, or in the amount of the deposited coins less a commission, to the user and not a receipt that is redeemable for cash by the user. The coin redemption machine 10 optionally includes a coin dispensing module for dispensing coins back to the user. Alternatively still, the coin redemption machine does not include a coin dispensing module and the amount due the user is rounded down to, or up to, the nearest whole dollar. A currency processing machine including a coin dispensing module and a currency bill dispensing module is described in U.S. Pat. No. 6,318,537 B1, incorporated herein by reference above. A coin redemption machine that outputs currency bills, and optionally coins, eliminates security concerns associated with the duplication of receipts because the coins are redeemed at the time of the transaction and any receipt issued is not redeemable for currency bills. Rather, any receipt serves solely as a record of the transaction.

According to another alternative embodiment of the coin redemption machine 10, each coin redemption operation is assigned a transaction number. The receipt issued by the coin redemption machine 10 has a transaction number printed thereon and, optionally, includes the value of the coin processed. Alternatively, the receipt includes additional information such as commission information or retail store information. In a simple form, such an embodiment includes a second, remote display located at the cashier's station or redemption area where the user redeems the receipts. The second display communicates to the cashier the transaction numbers and corresponding dollar amounts. When presented with a receipt for redemption, the cashier accesses the display to confirm that the dollar amount printed on the receipt favorably compares to the amount listed on the display. This embodiment guards against fraud by reducing the opportunity for tampering with the amount printed on the receipt. Alternatively, the dollar amount is displayed on the second display after the receipt bearer or cashier keys in the transaction number.

In more sophisticated embodiments, the controller 30 of the coin redemption machine 10 automatically eliminates transaction numbers from the second display after receipts are redeemed. For example, after a user presents a receipt to a cashier and that receipt bearing a particular transaction number is redeemed, the controller 30 deletes, "closes-out," or otherwise invalidates that particular transaction number thus preventing a receipt bearing that particular number from being redeemed again. Alternatively, the controller 30 causes the display to indicate that redeemed transaction numbers have in fact been redeemed and are no longer valid. Alternatively still, the receipt may include a barcode of the transaction number which is automatically read by a scanner at the cashier's station. Once the barcode is read, the dollar amount to be dispensed to the user is automatically displayed on a screen and the transaction number is automatically marked as redeemed on the display or, alternatively, is marked as so in a database where the transaction numbers and corresponding dollar amounts are stored. Accordingly, fraud by presenting duplicate receipts for redemption is guarded against.

Additionally, banks or stores may institute policies requiring that receipts may only be redeemed at the particular location where the coins are deposited. Put another way, receipts will only be honored at the store location where the receipt-issuing machine 10 is located. Thus, indicia of a particular store location is printed on the receipt. Such an embodiment discourages the duplicating of receipts and redeeming those receipts at other locations where the particular batch number may still be valid. Additionally or alternatively, a store may require that a receipt be redeemed within a predetermined amount of time (e.g., one or two hours). Alternatively still, the coin redemption machines 10 are networked together, as described above in connection with FIG. 3, for storing the transaction numbers in a common database to prevent transaction numbers from being redeemed at several locations. For example, a transaction number resulting from a transaction at a first store would be displayed on a second screen of the cashier's station in a second store. Alternatively still, the customer may key in the transaction number at a cash dispensing station which automatically (or manually via an attendant) output cash to the customer corresponding to the dollar amount. Each transaction number would only be capable of being redeemed one time.

In yet another alternative embodiment, a second printer is disposed at the cashier's station for printing a duplicate receipt which allows the cashier to compare the received receipt with the cashier's duplicate receipt for verifying that the information on both receipts favorably compares. Once the receipt is redeemed, the cashier can mark both receipts as redeemed, place both the receipts in a "redeemed area," or destroy the two receipts. Many types of fraud, including receipt counterfeiting, are prevented by only allowing redemption of receipts having a duplicate receipt printed at the cashier's station and by not allowing the redemption of receipts that have already been redeemed. Alternatively still, an additional display for displaying receipt numbers and amount may be placed at cashier's station, which would allow the cashier to ensure that the receipt number and amounts match what is shown on the receipt.

In still another alternative embodiment, the user inputs via the display 12 of the coin redemption machine 10 an account number wherein the value of the deposited coins, or the value of the deposited coins less a commission, is credited to the user's account. Types of accounts include bank accounts, credit card accounts, store credit card accounts, or other types of store accounts. Alternatively, a user inserts a media card into media slot 18 and coin redemption machine 10 reads the user's account number. The user may be required to input via the display 12 a personal identification number as an additional security measure. Alternatively still, the coin redemption machine 10 may credit the amount to a smartcard inserted into media slot 18. These embodiments frustrate fraudulent activities surrounding manipulating the receipt because any receipt issued serves solely as a record of the transaction and is not redeemable.

According to another alternative embodiment of the present invention, a user wanting to redeem coins for paper currency is first prompted by the display 12 of the coin redemption machine 10 for that user's security code. The security code can take on different forms according to various alternative embodiments of the present invention including the user's numerical birth date, social security number, or an identification number assigned by the particular retail or bank location. Alternatively, the coin redemption machine is tied to a network as illustrated in FIG. 3, and the user may input the user's store card, credit card, or ATM card as a security feature. After inputting the user's security code, the coin redemption machine 10 permits the user to deposit the user's coins. The coin redemption machine 10 processes the coins and determines the dollar amount of the deposited coins. This amount is communicated to the user via the display 12. If the amount is unacceptable to the user, the user indicates as such via the display and the machine 10 alerts an attendant (via a flashing light, audible signal, or electronically in an embodiment where the coin redemption machine 10 is linked to a host or network) to assist the user. Alternatively, the coin redemption machine 10 holds coins in an escrow area until the user indicates that the displayed amount is acceptable. If the user indicates that the amount is not acceptable, the coins are returned to the user from the escrow region. If the amount is acceptable to the user, the user indicates as such via the display 12 and a receipt is printed bearing a transaction number and optionally the dollar amount of the deposited coins. After the receipt is printed, the display 12 instructs the user to proceed to a particular cashier station, check-out lane, teller window or customer service area (collectively "redemption area") to redeem the receipt.

At the redemption area, the user is directed to a terminal where the user is prompted to enter the security code (or swipe the same card) that the user previously entered at the coin redemption machine 10 prior to depositing the coins. Next, the terminal prompts the user for the transaction number printed on the receipt. After the user has entered the correct security code and transaction number, the terminal displays the value of the deposited coins and displays authorization to a store employee to pay the user an amount equivalent to dollar amount of the deposited coins. Alternatively, if a commission is charged, the dollar amount of the deposited coins as well as that amount less a commission charged for use of the coin redemption machine 10 is displayed on the terminal.

According to yet another alternative embodiment of the present invention, one or more coin redemption machines are tied to a network, as illustrated in FIG. 3, which communicates with an automatic-teller-machine ("ATM") or a cash and coin dispensing station. The security code (or account number corresponding to a card inserted in the media slot 18), the transaction number and the determined dollar amount of the deposited coins are stored in a memory linked to the coin redemption machine 10 and the ATM. The user proceeds with the receipt bearing the transaction number to the ATM and inputs the user's a security code (or swipes a card) and the transaction number. The security code and transaction number input are compared to those stored in memory and are validated. Upon validation, the ATM then dispenses an appropriate amount of currency bills, and optionally coins, to the user.

This latter embodiment provides an additional level of protection to the user by storing the security numbers, transaction numbers, and determined totals in memory. If the user forgets the transaction number or misplaces the receipt, the user can request that an attendant access the system to look-up the transaction number(s) corresponding to the user's security code, which is stored in memory. In certain situations, the attendant may require a predetermined time period to pass between the initial contact by an alleged user and revealing the transaction number to the user. After waiting the predetermined time period, if no other claims are made on that transaction number, the attendant can pay the user, reveal the transaction number, or both.

Figure 4:
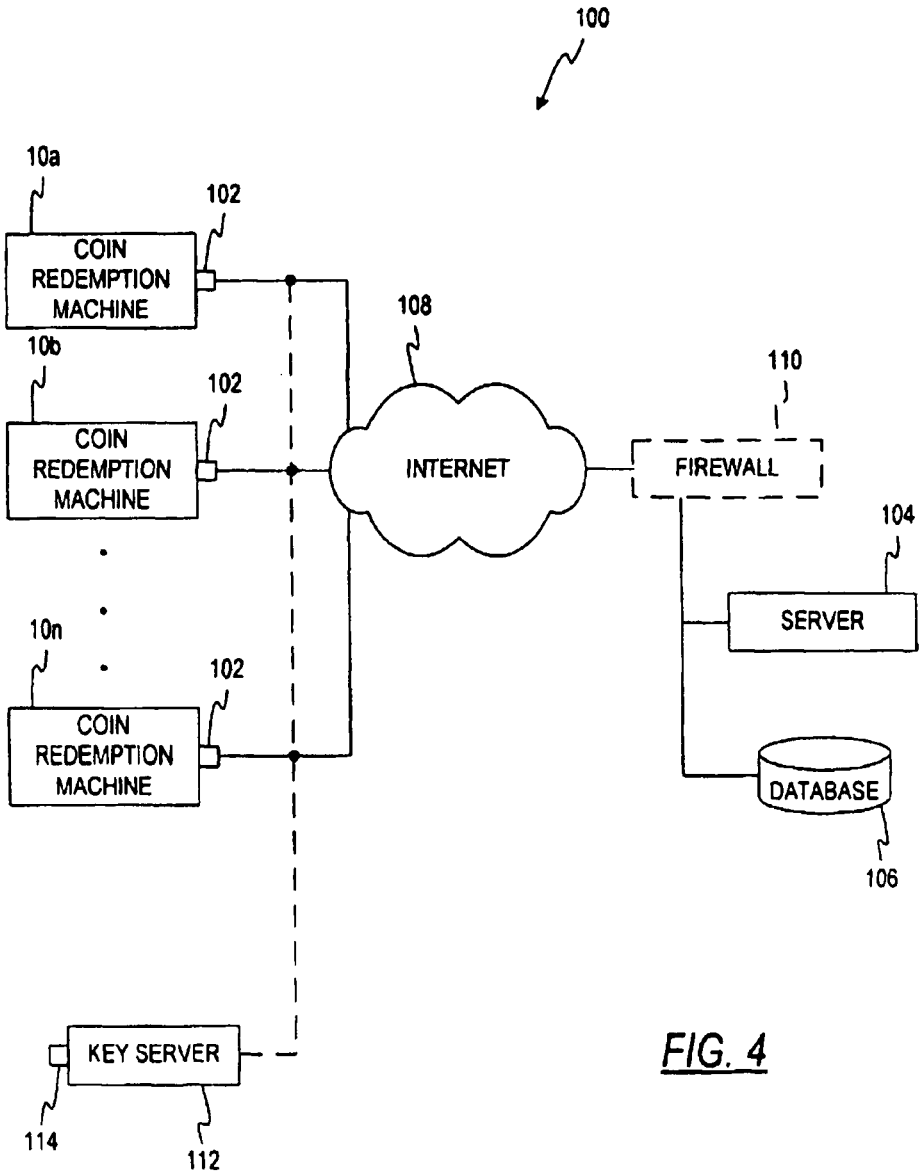
FIG. 4 is a block diagram illustrating component and connections in a redemption network according to an alternative embodiments of the present invention.

Referring now to FIG. 4, there is depicted a coin redemption network 100 according to an alternative embodiment of the present invention having a plurality of coin redemption machines 10a, 10b, . . . 10n communicatively linked thereto. Each coin redemption machine 10 has a connected communications device 102 such as, for example, a modem or ethernet card. In an alternative embodiment, the communication device 102 is a wireless device that enables wireless communication between a coin redemption machine 10 and to the coin redemption network 100.

According to one embodiment of the coin redemption network 100, the coin redemption machines 10 are equipped to communicate with one or more servers 104 and further to send information to or retrieve information from one or more databases 106. One method of enabling this communication is to connect the coin redemption machines 10, the one or more servers 104 and the one or more databases 106 via the Internet 108. The one or more servers 104 may be web servers, and further may be adapted to execute servlets, which may initiate and complete the tasks involved in running the coin redemption network 100. According to an alternative embodiment, each of the coin redemption machines may be linked directly (wired or wireless) to the servers), and not to the Internet 108. Or, alternatively still, each of the coin redemption machines periodically "dial-in" directly to the server(s).

In order to maintain the integrity of information sent between the components of the coin redemption network 100, a number of security schemes may be employed. For example, a firewall 110 may be set up between the coin redemption machines 10 and the server and database components. Further, a key server 112 with a key server communications device 114 may be employed, as is known in the communications field.

Periodically, such as at predetermined times throughout the day or upon the occurrence of certain events such as at the conclusion of a coin redemption transaction, an update routine is performed wherein information is sent from the coin redemption machines 10 to the server 104. This information may include a transaction number and the corresponding dollar amount of received coins, a user's account information and the corresponding dollar amount of received coins and/or other information received from the user such as a security code and other information corresponding to the transaction. Further, in alternative embodiments of the coin redemption network, information regarding the status of the coin redemption machine 10 is sent to the server 104. Information regarding the status of the coin redemption machine 10 may include, or example, the number of coins (and corresponding dollar amount) in each of the coin receptacle stations 28 (FIG. 2), a signal indicating that a coin bag in a coin receptacle station 28 is full and service is required, a signal indicating that the printer 32 (FIG. 2) is low on paper or ink, or some other information indicative of a fault or error condition. Alternatively still, the operator interface 12 (FIG. 1) may include a button that a user depresses for summoning an attendant of the coin redemption machine 10. This request may be directed to the attendant via the coin redemption network 100.

An update routine may be carried out via calls automatically being made by a coin redemption machine 10 through the communications device 102 at predetermined times, on the occurrence of predetermined events or they may be manually initiated by an attendant of the machine 10 or a user of the machine 10 as indicated above An update routine may also be initiated by the server 104 or by users of the server 104.

Figure 5:
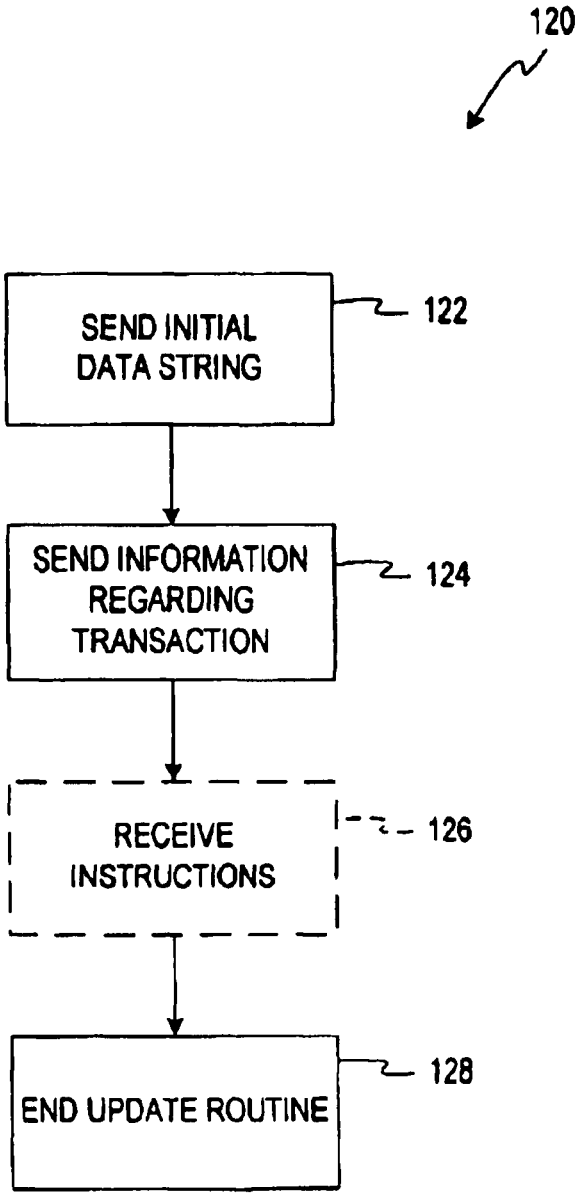
FIG. 5 is a block diagram of a coin redemption network update routine according to an alternative embodiment of the present invention.

One type of update routine 120 is shown in FIG. 5. According to one embodiment, the update routine 120 is initiated by the coin redemption machine 10 upon completion of a coin redemption process wherein the coin redemption machine 10 has output a receipt indicative of the dollar amount of coins received from the user ("the dollar amount") and a transaction number. According to one embodiment of the coin redemption network, the update routine begins with the sending of an initial data string from the coin redemption machine 10, as shown at step 122. The initial data string contains information initializing the communication, and may further contain information pertaining to the identity of the sending coin redemption machine 10 and protocol data units (PDUs) defining the type of information transmission. Further, the initial data string contains information identifying the transmission as an update routine.

Next, as shown at step 124, the information corresponding to the dollar amount for the transaction and the transaction number are sent from the redemption machine 10 to the server 104. In other embodiments, this information may include information corresponding to a plurality of transaction numbers and corresponding dollar amounts stored by the coin redemption machine 10 for a period of time such as several minutes. In other embodiments where the dollar amount is being credited to a smartcard, the machine 10 may only send information relating to the dollar amount credited to a smart card. In various other alternative embodiments, the machine 10 may also send information regarding user identification information (if input by a user of the machine).

Optionally, as shown in step 126, the coin redemption machine 10 receives instructions from the server 104. Such instructions may include instructions regarding a promotion wherein a bonus is added to the dollar amount of processed coins, regarding a change in commission to charge for use of the machine 10, or instructions regarding to what information to be printed in the receipt such as, for example, time, date, or other promotional information. The update routine is concluded at step 128.

According to one embodiment of the present invention, the plurality of coin redemption machines 10 are connected to a bank's network in a manner as shown in FIG. 3 or via the Internet as shown in FIG. 4 for crediting coins deposited in a redemption machine to a user's bank account. The user may be required to input identification information as described above. Crediting the coins directly to a bank account reduces the chances for fraud associated the redemption with counterfeit or duplicated receipts. The network 52 (FIG. 3) or server 104 (FIG. 4) is updated at predetermined times or on the occurrence of certain events to update the user's account with information regarding deposited coins. For example, according to one embodiment, the bank's network 52 (FIG. 3) or server 104 (FIG. 4) is updated upon completion of each transaction so that a user's account is credited with the deposited amount substantially immediately. This is in contrast with a traditional deposit-type ATM machine wherein deposits are not credited to a user's account until the deposited funds are retrieved by an operator and later verified back at a bank. In other embodiments, the bank's network 52 (FIG. 3) or server 104 (FIG. 4) is updated at predetermined time intervals, such as every hour, wherein the updates include information regarding all of the deposits over the previous hour. In such an embodiment, also, the users' accounts are updated very soon after the deposits are made.

In addition to embodiments described above and in the accompanying claims, several embodiments of the present inventions will now be described.

Alternative Embodiment A

A. A coin redemption system in which a user deposits a batch of mixed coins of a plurality of denominations, the system comprising:

a coin input area for receiving a batch of mixed coins from a user of the coin redemption system;

a coin processing unit coupled to the coin input area for determining the aggregate value of the coins received from the user;

a controller for assigning a transaction number corresponding to the batch of received coins;

a first printer for printing a receipt indicative of the determined value and the assigned transaction number; and an output device disposed in a redemption area for displaying the assigned transaction number and the determined value.

Alternative Embodiment B

B. The coin processing system of alternative embodiment A wherein the output device is a printer.

Alternative Embodiment C

C. The coin processing system of alternative embodiment A wherein the output device is a display.

Alternative Embodiment D

D. A method for redeeming coins for currency bills with a coin redemption system, the method comprising:

receiving a batch of mixed coins of a plurality of denominations in a coin receiving area of the coin redemption system;

determining the aggregate value of the received coins with a coin processing unit of the coin redemption system;

assigning a transaction number corresponding to the batch of received coins;

printing a first receipt indicative of the determined aggregate value and the assigned transaction number with a first printer of the coin redemption system;

displaying the determined aggregate value and the assigned transaction number separate from printing the first receipt;

comparing the printed receipt to the displayed determined aggregate value and assigned transaction number; and redeeming the receipt for currency bills and coins when the printed receipt favorably compares to the displayed determined aggregate value and assigned transaction number.

Alternative Embodiment E

E. The method of alternative embodiment D where redeeming further comprises redeeming the receipt for currency bills and coins in an amount equal to the determined aggregate value.

Alternative Embodiment F

F. The method of alternative embodiment D where redeeming further comprises redeeming the receipt for currency bills and coins in an amount equal to the determined aggregate value less a commission.

Alternative Embodiment G

G. The method of alternative embodiment D wherein displaying further comprises printing a second receipt indicative of the determined aggregate value and the assigned transaction number with a second printer at a second location where redemption is to occur.

Alternative Embodiment H

H. The method of alternative embodiment D wherein displaying further comprises displaying on a screen at a second location where redemption is to occur.

Alternative Embodiment I

I. A coin redemption system for receiving a batch of mixed coins of a plurality of denominations from a user and securely providing the user with a receipt that is redeemable for cash, the system comprising:

at least one coin redemption machine comprising, an first user interface for receiving a security code from a user of the coin redemption system, a coin input area for receiving the batch of mixed coins, a controller for assigning a transaction number corresponding to the batch of received coins, a coin processing unit coupled to the coin input area for determining the aggregate value of the received coins, and a printer for printing a receipt indicative of the determined aggregate value and the assigned transaction number; and at least one redemption station communicatively linked to the at least one coin redemption machine comprising, a second user interface adapted to receive input from the user including input indicative of the security code and the assigned transaction number, the second user interface being adapted to display the determined aggregate value upon receipt of the security code and the assigned transaction number, wherein the controller is adapted to verify that the received security code favorably compares to the received transaction number, and means for providing the user with currency bills and coins when the received security code favorably compares to the received transaction number.

Alternative Embodiment J

J. The coin redemption system of alternative embodiment I wherein the currency bills and coins are provided to the user in an amount equal to the determined aggregate value.

Alternative Embodiment K

K. The coin redemption system of alternative embodiment I wherein the currency bills and coins are provided to the user in an amount equal to the determined aggregate value less a commission.

Alternative Embodiment L

L. A method for securely redeeming coins for currency bills comprising:

receiving, on a first occasion, input from a user indicative of a security code;

receiving a batch of mixed coins of a plurality of denominations in a coin receiving area;

determining the aggregate value of the received batch of coins;

assigning a transaction number corresponding to the received batch of coins;

issuing a receipt indicative of the determined aggregate value and the assigned batch number, receiving, on a second occasion, input from the user indicative of the security code and the assigned transaction number;

comparing the input received on the first occasion with the input received on the second occasion; and dispensing currency bills and coins to the user when the input received on the first occasion favorably compares with the input received on the second occasion.

Alternative Embodiment M

M. The method of alternative embodiment L where dispensing further comprises dispensing currency bills and coins to the user in an amount equal to the determined aggregate value.

Alternative Embodiment N

N. The method of alternative embodiment L where dispensing further comprises dispensing currency bills and coins to the user in an amount equal to the determined aggregate value less a commission.

Alternative Embodiment O

O. A coin processing system for receiving a batch of mixed coins of a plurality of denominations from a user and securely providing the user with a receipt that is redeemable for cash, the system comprising:

at least one coin redemption machine comprising a media reader adapted to read information from a media card of a user of the coin processing system, a coin input area for receiving a batch of coins from the user, a controller for assigning a transaction number corresponding to the received batch of coins, a coin processing unit coupled to the coin input area for determining the aggregate value of the received coins, and a printer for printing a receipt indicative of the determined aggregate value and the assigned transaction number; and at least one redemption station communicatively linked to the at least one coin redemption machine comprising a user terminal including a media reader adapted to read information from the media card of the user and a user interface being adapted to receive input from the user indicative of the assigned transaction number, the user terminal being adapted to display the determined aggregate value upon reading the media card and receipt of the assigned transaction number, wherein the controller is adapted to verify that information read from the media card favorably compares to the received transaction number, means for providing the user with currency bills and coins when the information read from the media card favorably compares to the received transaction number.

Alternative Embodiment P

P. The coin processing system of alternative embodiment O wherein the currency bills and coins are provided to the user in an amount equal to the determined aggregate value.

Alternative Embodiment Q

Q. The coin processing system of alternative embodiment O wherein the currency bills and coins are provided to the user in an amount equal to the determined aggregate value less a commission.

Alternative Embodiment R

R. A method for redeeming coins for currency bills with a coin processing system including a coin redemption machine and a redemption area, the method comprising:

receiving a batch of coins of mixed denominations in a coin receiving area of the coin redemption machine;

determining the aggregate value of the received coins with a coin processing unit of the coin redemption machine;

printing a receipt indicative of the determined aggregate with a printer of the coin redemption machine;

presenting an operator of the redemption area with the receipt;

calculating a commission after presenting the operator of the redemption are with the receipt;

providing the user with currency bills in an amount equivalent the determined aggregate value less the calculated commission.

Alternative Embodiment S

S. The method of alternative embodiment R further comprising displaying to the user the percentage of commission to be charged.

Alternative Embodiment T

T. The method of alternative embodiment R further comprising displaying to the user a chart summarizing the commission to be charged, the chart including at least one amount and a corresponding commission.

Alternative Embodiment U

U. A coin redemption system comprising:

one or more coin redemption machines located at one or more locations; each coin redemption machine being adapted to count a batch of mixed coins received from a user and to determine a total amount corresponding to the value of the received coins;

a database for storing information; and at least one server adapted to electronically communicate with each coin redemption machine, the at least one server being adapted to receive information indicative of the determined total amounts from each coin redemption machine and to store that information in the database.

Alternative Embodiment V

V. The system of alternative embodiment U further comprising an operator interface for receiving information from an operator of a coin redemption machine indicative of an account of the user.

Alternative Embodiment W

W. The system of alternative embodiment U wherein the at least one server is associated with a bank.

Alternative Embodiment X

X. The system of alternative embodiment U wherein the at least one server receives information indicative of the determined total amount substantially immediately after the total amount corresponding to the value of the received coins is determined by the coin redemption machine.

Alternative Embodiment Y

Y. The system of alternative embodiment X wherein the information is stored in the database substantially immediately after information indicative of the determined total is received by the server.

Alternative Embodiment Z

Z. The system of alternative embodiment U wherein each of the one or more coin redemption machines is adapted for electronic communication over the Internet, and wherein the one or more servers are web servers adapted for electronic communication over the Internet and are adapted to located and communicated with each of the one or more coin redemption machines over the Internet.

While the present invention has been described with reference to one or more particular embodiments, those skilled in the art will recognize that many changes may be made thereto without departing from the spirit and scope of the present invention. Each of these embodiments and obvious variations thereof is contemplated as falling within the scope of the claimed invention, which is set forth in the following claims.

What is claimed is:

[1. A coin redemption system in which a user deposits a batch of mixed coins of a plurality of denominations, the system comprising:

a coin input area for receiving a batch of mixed coins from a user of the coin redemption system;

a coin processing unit coupled to the coin input area for determining the aggregate value of the coins received from the user;

a controller for assigning a transaction number corresponding to the batch of received coins;

a first printer for printing a receipt indicative of the determined value and the assigned transaction number; and an output device disposed in a redemption area for displaying the assigned transaction number and the determined value.]

[2. The coin processing system of claim 1 wherein the output device is a printer.]

[3. The coin processing system of claim 1 wherein the output device is a display.]

[4. A method for redeeming coins for currency bills with a coin redemption system, the method comprising:

receiving a batch of mixed coins of a plurality of denominations in a coin receiving area of the coin redemption system;

determining the aggregate value of the received coins with a coin processing unit of the coin redemption system;

assigning a transaction number corresponding to the batch of received coins;

printing a first receipt indicative of the determined aggregate value and the assigned transaction number with a first printer of the coin redemption system;

displaying the determined aggregate value and the assigned transaction number separate from printing the first receipt;

comparing the printed receipt to the displayed determined aggregate value and assigned transaction number; and redeeming the receipt for currency bills and coins when the printed receipt favorably compares to the displayed determined aggregate value and assigned transaction number.]

[5. The method of claim 4 where redeeming further comprises redeeming the receipt for currency bills and coins in an amount equal to the determined aggregate value.]

[6. The method of claim 4 where redeeming further comprises redeeming the receipt for currency bills and coins in an amount equal to the determined aggregate value less a commission.]

[7. The method of claim 4 wherein displaying further comprises printing a second receipt indicative of the determined aggregate value and the assigned transaction number with a second printer at a second location where redemption is to occur.]

[8. The method of claim 4 wherein displaying further comprises displaying on a screen at a second location where redemption is to occur.]

9. A coin redemption system for receiving a batch of mixed coins of a plurality of denominations from a user and securely providing the user with a receipt that is redeemable for cash, the system comprising:

at least one coin redemption machine comprising, a first user interface for receiving a security code from a user of the coin redemption system, a coin input area for receiving the batch of mixed coins, a controller for assigning a transaction number corresponding to the batch of received coins, a coin processing unit coupled to the coin input area for determining the aggregate value of the received coins, and a printer for printing a receipt indicative of the determined aggregate value and the assigned transaction number; and at least one redemption station communicatively linked to the at least one coin redemption machine comprising, a second user interface [adapted] *comprising a user-input device* to receive input from the user including input indicative of the security code and the assigned transaction number, the second user interface [being adapted] *comprising a display* to display the determined aggregate value upon receipt of the security code and the assigned transaction number, wherein the controller is [adapted] *associated with executable instructions* to verify that the received security code favorably compares to the received transaction number, and

[means] *a currency dispenser* for providing the user with currency bills [and coins] *in an amount related to the determined aggregate value* when the received security code favorably compares to the received transaction number.

10. The coin redemption system of claim 9, *wherein the at least one redemption station further comprises a coin dispensing module, and* wherein [the] currency bills and coins are provided to the user in an amount equal to the determined aggregate value.

11. The coin redemption system of claim 9, *wherein the at least one redemption station further comprises a coin dispensing module, and* wherein [the] currency bills and coins are provided to the user in an amount equal to the determined aggregate value less a commission.

12. A method for securely redeeming coins for currency bills comprising:

receiving, on a first occasion, *an* input from a user *via a user input device of a coin redemption machine, the user input being* indicative of a security code;

receiving a batch of mixed coins of a plurality of denomination in a coin receiving area *of the coin redemption machine*;

determining the aggregate value of the received batch of coins *using a coin processing module of the coin redemption machine*;

assigning, *using a controller associated with the coin redemption machine,* a transaction number corresponding to the received batch of coins;

issuing a receipt indicative of the determined aggregate value and the assigned batch number;

receiving, on a second occasion, *an* input from the user *via a user input device of a terminal separate from the coin redemption machine, the user input* indicative of the security code and the assigned transaction number;

comparing, *using the controller or another processor,* the input received on the first occasion with the input received on the second occasion;

dispensing currency *comprising* bills [and coins] to the user *in an amount related to the determined aggregate value* when the input received *by the user input device of the coin redemption machine* on the first occasion favorably compares with the input received *by the user input device of the terminal* on the second occasion.

13. The method of claim 12, where *the act of* dispensing *currency* further comprises dispensing currency bills and coins to the user in an amount equal to the determined aggregate value *or in an amount equal to the determined aggregate value less a commission*.

14. The method of claim 12, where *the act of* dispensing *currency* further comprises dispensing *at least* currency bills [and coins] to the user [in an amount equal to the determined aggregate value less a commission] *from a currency bill dispensing machine associated with the terminal*.

15. A coin processing system for receiving a batch of mixed coins of a plurality of denominations from a user and securely providing the user with a receipt that is redeemable for cash, the system comprising:

at least one coin redemption machine comprising a media *card* reader adapted to read information from a media card of a user of the coin processing system, a coin input area for receiving a batch of coins from the user, a controller for assigning a transaction number corresponding to the received batch of coins *and for associating the information from the media card of the user of the coin processing system to the transaction number*, a coin processing unit coupled to the coin input area for determining the aggregate value of the received coins, and a printer for printing a receipt indicative of the determined aggregate value and the assigned transaction number; and at least one *self-service* redemption station communicatively linked to the at least one coin redemption machine comprising a user terminal including a media *card* reader adapted to read information from the media card of the user and a user interface [being adapted] *comprising a user-input device* to receive input from the user indicative of the assigned transaction number, the user terminal [being adapted] *comprising a display* to display the determined aggregate value upon reading the media card and receipt of the assigned transaction number, wherein the controller is [adapted] *associated with executable instructions* to verify that information read from the media card favorably compares to the received transaction number, *and*

[means for providing] *a currency dispensing device configured to provide* the user with currency *comprising* bills [and coins] *relating to the determined aggregate value associated with the transaction number* when the information read from the media card favorably compares to the received transaction number.

16. The coin processing system of claim 15, *wherein the currency dispensing device further comprises a coin dispenser configured to dispense coins,* wherein [the] currency bills and coins are provided to the user in an amount equal to the determined aggregate value.

17. The coin processing system of claim 15, *wherein the currency dispensing device further comprises a coin dispenser configured to dispense coins,* wherein [the] currency bills and coins are provided to the user in an amount equal to the determined aggregate value less a commission.

*18. A method for redeeming coins for currency bills with a coin processing system including a coin redemption machine and a redemption area, the method comprising:*

*receiving a batch of coins of mixed denominations in a coin receiving area of the coin redemption machine;*

*determining the aggregate value of the received coins with a coin processing unit of the coin redemption machine;*

*assigning a transaction number corresponding to the batch of received coins;*

*printing a receipt indicative of the determined aggregate and the assigned transaction number with a printer of the coin redemption machine;*

*presenting an operator of the redemption area with the receipt;*

*displaying the determined aggregate value and the assigned transaction number separate from printing the receipt;*

*calculating a commission after presenting the operator of the redemption area with the receipt;*

*providing the user with currency bills in an amount equivalent the determined aggregate value less the calculated commission when the printed receipt favorably compares to the displayed determined aggregate value and the assigned transaction number.*

*19. The method of alternative embodiment 18 further comprising displaying to the user the percentage of commission to be charged.*

*20. The method of alternative embodiment 18 further comprising displaying to the user a chart summarizing the commission to be charged, the chart including at least one amount and a corresponding commission.*

*21. A method for redeeming coins for currency bills with a coin redemption system, the method comprising:*

*inputting a security code into a user input device of a self-service coin processing machine;*

*receiving a batch of mixed coins of a plurality of denominations in a coin receiving area of the self-service coin processing machine;*

*determining the aggregate value of the received coins with a coin processing unit of the self-service coin processing machine;*

*storing a redemption value related to the aggregate value in a memory in association with the security code;*

*inputting the security code into a user input device of a self-service currency dispensing machine;*

*comparing the security code input at the user input device of the self-service currency dispensing machine to the security code input into the user input device of the coin processing machine; and*

*dispensing currency from the self-service currency dispensing machine equal to the redemption value when the security code input at the self-service currency dispensing machine favorably compares to the security code stored in association with the redemption value.*

*22. A method for redeeming coins according to claim 21, wherein the act of inputting a security code into the user input device of the self-service coin processing machine comprises inputting a magnetic strip card in a first card reader associated with the self-service coin processing machine and wherein the act of inputting the security code into the user input device of the self-service currency dispensing machine comprises inputting the same magnetic strip card in a second card reader associated with the self-service currency dispensing machine.*

* * * * *